(12) United States Patent
Anderson et al.

(10) Patent No.: US 9,971,859 B2
(45) Date of Patent: May 15, 2018

(54) MODELING LOCALIZED TEMPERATURE CHANGES ON AN INTEGRATED CIRCUIT CHIP USING THERMAL POTENTIAL THEORY

(71) Applicant: GLOBALFOUNDRIES INC., Grand Cayman (KY)

(72) Inventors: Frederick G. Anderson, South Burlington, VT (US); Nicholas T. Schmidt, Colchester, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days. days.

(21) Appl. No.: 15/418,015

(22) Filed: Jan. 27, 2017

(65) Prior Publication Data

US 2017/0147726 A1 May 25, 2017

Related U.S. Application Data

(62) Division of application No. 14/748,595, filed on Jun. 24, 2015, now Pat. No. 9,582,621.

(51) Int. Cl.
*G06F 17/50* (2006.01)

(52) U.S. Cl.
CPC ...... *G06F 17/5036* (2013.01); *G06F 17/5068* (2013.01); *G06F 17/5081* (2013.01); *G06F 2217/38* (2013.01); *G06F 2217/80* (2013.01)

(58) Field of Classification Search
CPC ............. G06F 17/5036; G06F 17/5068; G06F 17/5081; G06F 2217/38; G06F 2217/80
See application file for complete search history.

(56) References Cited

U.S. PATENT DOCUMENTS

| | | | |
|---|---|---|---|
| 4,920,319 | A | 4/1990 | Viertl |
| 5,406,212 | A | 4/1995 | Hashinaga et al. |
| 6,168,311 | B1 | 1/2001 | Xiao et al. |
| 6,711,723 | B2 | 3/2004 | Tsai et al. |
| 6,885,203 | B1 | 4/2005 | Woodberry et al. |

(Continued)

OTHER PUBLICATIONS

D'Esposito et al., "A Study on Transient Intra-Device Thermal Coupling in Multifinger SiGe HBTs (Student)", IEEE, 2014, pp. 179-182.

(Continued)

*Primary Examiner* — Naum B Levin
(74) *Attorney, Agent, or Firm* — Gibb & Riley, LLC; Anthony J. Canale

(57) ABSTRACT

A temperature change of a device on an integrated circuit chip due to self-heating and thermal coupling with other device(s) is modeled considering inefficient heat removal from the backside of the chip. To perform such modeling, ratios of an imaginary heat amount to an actual heat amount for different locations on the IC chip must be predetermined using a test integrated circuit (IC) chip. During testing, one test device at one specific location on the test IC chip is selected to function as a heat source, while at least two other test devices at other locations on the test IC chip function as temperature sensors. The heat source is biased and changes in temperature at the heat source and at the sensors are determined. These changes are used to calculate the value of the imaginary heat amount to actual heat amount ratio to be associated with the specific location.

20 Claims, 10 Drawing Sheets

(56) References Cited

U.S. PATENT DOCUMENTS

| | | |
|---|---|---|
| 6,898,084 B2 | 5/2005 | Misra |
| 7,383,520 B2 | 6/2008 | Chandra |
| 7,452,793 B2 | 11/2008 | Kaushal et al. |
| 8,071,916 B2 | 12/2011 | Iwata et al. |
| 8,286,111 B2 | 10/2012 | Chandra et al. |
| 8,332,190 B2 | 12/2012 | Tanomura et al. |
| 8,539,408 B1 | 9/2013 | Cheng et al. |
| 8,549,462 B2 | 10/2013 | Malladi et al. |
| 8,633,726 B2 | 1/2014 | Koh et al. |
| 8,860,142 B2 | 10/2014 | Poon et al. |
| 9,013,035 B2 | 4/2015 | Zhao et al. |
| 9,037,446 B2 | 5/2015 | Xie et al. |
| 9,582,621 B2 * | 2/2017 | Anderson ........... G06F 17/5036 |
| 2003/0055613 A1 | 3/2003 | Tsai |
| 2007/0009240 A1 | 1/2007 | Miyake et al. |
| 2008/0206907 A1 | 8/2008 | Shishido et al. |
| 2009/0164183 A1 | 6/2009 | Smith et al. |
| 2012/0180979 A1 | 7/2012 | Harrington |
| 2013/0294476 A1 | 11/2013 | Zettler et al. |
| 2015/0370937 A1 | 12/2015 | Liu et al. |
| 2016/0027713 A1 | 1/2016 | Hook et al. |

OTHER PUBLICATIONS

USPTO Office Action Communication, U.S. Appl. No. 14/748,595, dated Sep. 27, 2016, pp. 1-4.
USPTO Office Action Communication, U.S. Appl. No. 14/748,595, dated Oct. 20, 2016, pp. 1-9.
USPTO Notice of Allowance Communication, U.S. Appl. No. 14/748,595, dated Nov. 22, 2016, pp. 1-7.
Chinese Application No. 201610257167.5, Office Action Communication dated Oct. 10, 2017, pp. 1-4.

* cited by examiner

MODELING LOCALIZED TEMPERATURE CHANGES ON AN INTEGRATED CIRCUIT CHIP USING THERMAL POTENTIAL THEORY

CROSS-REFERENCE TO RELATED APPLICATIONS

This application claims the benefit under 35 U.S.C. § 120, as a divisional of U.S. patent application Ser. No. 14/748,595 filed on Jun. 24, 2015, issued as U.S. Pat. No. 9,582,621 on Feb. 28, 2017, the entire teachings of which are incorporated herein by reference.

FIELD OF THE INVENTION

The embodiments disclosed herein relate to integrated circuit (IC) chip design and, more particularly, to embodiments of a system and method for modeling temperature changes at one location on an IC chip based on heat generated at one or more other locations on the IC chip.

BACKGROUND

More particularly, the performance of a device (e.g., a field effect transistor (FET), a bipolar transistor, a resistor, a capacitor, etc.) on an integrated circuit (IC) chip can vary as a function of temperature. The temperature of a device can vary due to the self-heating effect (SHE). The self-heating effect refers to heat generated by the device itself, when active. Those skilled in the art will recognize that there is a strong relationship between the supply voltage applied to a device when active and the temperature of that device. The temperature of a device can also vary due to the thermal coupling (i.e., due to the device's proximity to adjacent heat source(s), such as adjacent device(s)). Current modeling techniques provide for modeling localized temperature changes due to self-heating and due to thermal coupling with adjacent heat source(s). However, modeling of a localized temperature change due to thermal coupling typically involves calculations of thermal resistance along thermal pathways and such calculations can be quite complex, time consuming and oftentimes inaccurate. This is particularly true when heat removal (e.g., by convection or radiation) from the backside of IC chip contained in a chip package is inefficient such that the temperature distribution across the backside of the IC chip varies, changing the heat flow lines and, thereby changing the thermal resistances that need to be calculated. Therefore, there is a need in the art for a more efficient technique for modeling such localized temperature changes due to self-heating and thermal coupling.

SUMMARY

In view of the foregoing, disclosed herein embodiments of a system and method for thermal modeling and, particularly, for modeling a temperature change of a device on a frontside of an integrated circuit (IC) chip due to self-heating, if any, and further due to thermal coupling with device(s) on the frontside of the IC chip, given the possibility of inefficient heat removal from the backside of the IC chip. The embodiments avoid the need for calculations of thermal resistances by employing thermal potential theory. Specifically, in the embodiments, a boundary condition can be set off the backside of the IC chip. The boundary condition is analogous to an "image charge" used in electrostatics and is referred to herein as an imaginary heat amount. In order to implement the system and method, ratios of an imaginary heat amount to an actual heat amount for different locations on the IC chip must be predetermined using a test integrated circuit (IC) chip, which has multiple test devices at different locations and the same packaging solution as the IC chip at issue. During testing, one test device at one specific location on the test IC chip can be selected to function as a heat source, while at least two other test devices at other locations on the test IC chip function as temperature sensors. The heat source can be biased and changes in temperature at the heat source and at the sensors can be determined. These changes in temperature can then be used to calculate the value of the imaginary heat amount to actual heat amount ratio to be associated with the specific location. These processes can be repeated for all of the different locations and a set of such imaginary heat amount to actual heat amount ratios can then be stored in memory for use in thermal modeling.

More particularly, disclosed herein is a system for modeling a temperature change of a device on a frontside of an integrated circuit (IC) chip due to self-heating, if any, and further due to thermal coupling with another device on the frontside of the IC chip, given the possibility of inefficient heat removal from the backside of the IC chip.

This system can comprise a memory. The memory can store a design layout of an integrated circuit (IC) chip, which is packaged in a specific type of chip package. The IC chip can comprise a substrate having a frontside and a backside opposite the frontside. The IC chip can further comprise multiple devices at different locations on the frontside of the substrate. The memory can further store a set of values for imaginary heat amount to actual heat amount ratios associated with specific locations, respectively, of potential heat sources on the front side of the substrate. The values for imaginary heat amount to actual heat amount ratios can vary as a function of the different locations. The values for the imaginary heat amount to actual heat amount ratios in the set can, as discussed in greater detail below, be predetermined employing thermal potential theory and using a test integrated circuit (IC) chip packaged in the same specific type of chip package as the IC chip at issue.

The system can further comprise a processor in communication with the memory. The processor can generate, based on the design layout, a thermal model that models a total change in temperature, relative to a nominal temperature, of a first device on the frontside of the substrate. This total change in temperature of the first device can be equal to the sum of a first temperature change contribution due to self-heating of the first device, if any, and a second temperature change contribution due to thermal coupling with a second device and, particularly, a heat source at a specific location on the frontside of the substrate.

The second temperature change contribution of the second device can specifically be calculated based on a specific imaginary heat amount to actual heat amount ratio. This specific imaginary heat amount to actual heat amount ratio can be acquired by the processor from the set of values for imaginary heat amount to actual heat amount ratios stored in memory, given the specific location of the second device. It should be noted that, given this specific imaginary heat amount to actual heat amount ratio, a specific imaginary heat amount can be found and used as a boundary condition with respect to a point off the backside of the substrate and, particularly, a point that is aligned vertically with the specific location of the second device and that is separated from the backside of the substrate by the same distance as the specific location of the second device.

Also disclosed herein is a system for modeling a temperature change of a device on a frontside of an integrated circuit (IC) chip due to self-heating, if any, and further due to thermal coupling with other devices on the frontside of the IC chip, given the possibility of inefficient heat removal from the backside of the IC chip.

This system can similarly comprise a memory. The memory can store a design layout of an integrated circuit (IC) chip, which is packaged in a specific type of chip package. The IC chip can comprise a substrate having a frontside and a backside opposite the frontside. The IC chip can further comprise multiple devices at different locations on the frontside of the substrate. The memory can further store a set of values for imaginary heat amount to actual heat amount ratios associated with specific locations, respectively, of potential heat sources on the front side of the substrate. The values for the imaginary heat amount to actual heat amount ratios can vary as a function of the different locations. The values for the imaginary heat amount to actual heat amount ratios in the set can, as discussed in greater detail below, be predetermined employing thermal potential theory and using a test integrated circuit (IC) chip packaged in the same specific type of chip package as the IC chip at issue.

The system can further comprise a processor. The processor can generate, based on the design layout, a thermal model that models a total change in temperature, relative to a nominal temperature, of a first device on the frontside of the substrate. This total change in temperature of the first device can be equal to the sum of a first temperature change contribution due to self-heating of the first device, if any, and multiple second temperature change contributions due to thermal coupling with multiple second devices and, particularly, multiple heat sources at specific locations, respectively, on the frontside of the substrate.

Each second temperature change contribution can correspond to one of the second devices and can be calculated based on a specific imaginary heat amount to actual heat amount ratio. This specific imaginary heat amount to actual heat amount ratio can be acquired by the processor from the set of values for imaginary heat amount to actual heat amount ratios stored in memory, given the specific location of the second device. It should be noted that, given this specific imaginary heat amount to actual heat amount ratio, a specific imaginary heat amount can be found and used as a boundary condition and is predetermined with respect to a point off the backside of the substrate and, particularly, a point that is aligned vertically with the specific location of the second device and that is separated from the backside of the substrate by the same distance as the specific location of the second device.

Also disclosed herein is a method for modeling a temperature change of a device on a frontside of an integrated circuit (IC) chip due to self-heating, if any, and further due to thermal coupling with another device on the frontside of the IC chip, given the possibility of inefficient heat removal from the backside of the IC chip.

The method can comprise accessing, by a processor from a memory, a design layout and a set of values for imaginary heat amount to actual heat amount ratios. The design layout can be of an integrated circuit (IC) chip, which is packaged in a specific type of chip package. The IC chip can comprise a substrate having a frontside and a backside opposite the frontside. The IC chip can further comprise multiple devices at different locations on the frontside of the substrate. The set of values for imaginary heat amount to actual heat amount ratios can comprise multiple imaginary heat amount to actual heat amount ratios, which are associated with specific locations, respectively, of potential heat sources on the front side of the substrate. The values for the imaginary heat amount to actual heat amount ratios can vary as a function of the different locations. The values for the imaginary heat amount to actual heat amount ratios in the set can be predetermined, as discussed in greater detail below, employing thermal potential theory and using a test integrated circuit (IC) chip packaged in the same specific type of chip package as the IC chip at issue.

The method can further comprise generating, by the processor based on the design layout, a thermal model that models a total change in temperature, relative to a nominal temperature, of a first device on the frontside of the substrate. This total change in temperature of the first device can be equal to the sum of a first temperature change contribution due to self-heating of the first device, if any, and a second temperature change contribution due to thermal coupling with a second device and, particularly, a heat source on the frontside of the substrate.

The second temperature change contribution of the second device can specifically be calculated based on a specific imaginary heat amount to actual heat amount ratio. This specific imaginary heat amount to actual heat amount ratio can be acquired by the processor from the set of imaginary heat amount to actual heat amount ratios stored in memory, given the specific location of the second device. It should be noted that, given this specific imaginary heat amount to actual heat amount ratio, a specific imaginary heat amount can be found and used as a boundary condition with respect to a point off the backside of the substrate and, particularly, a point that is aligned vertically with the specific location of the second device and that is separated from the backside of the substrate by the same distance as the specific location of the second device.

Also disclosed herein is a method for modeling a temperature change of a device on a frontside of an integrated circuit (IC) chip due to self-heating, if any, and further due to thermal coupling with other devices on the frontside of the IC chip, given the possibility of inefficient heat removal from the backside of the IC chip.

The method can comprise accessing, by a processor from a memory, a design layout and a set of values for imaginary heat amount to actual heat amount ratios. The design layout can be of an integrated circuit (IC) chip, which is packaged in a specific type of chip package. The IC chip can comprise a substrate having a frontside and a backside opposite the frontside. The IC chip can further comprise multiple devices at different locations on the frontside of the substrate. The set of values for imaginary heat amount to actual heat amount ratios can comprise multiple imaginary heat amounts, which are associated with specific locations, respectively, of potential heat sources on the front side of the substrate. The values for the imaginary heat amount to actual heat amount ratios can vary as a function of the different locations. The values for the imaginary heat amount to actual heat amount ratios in the set can, as discussed in greater detail below, be predetermined employing thermal potential theory and using a test integrated circuit (IC) chip packaged in the same specific type of chip package as the IC chip at issue.

The method can further comprise generating, by the processor based on the design layout, a thermal model that models a total change in temperature, relative to a nominal temperature, of a first device on the frontside of the substrate. This total change in temperature of the first device can be equal to the sum of a first temperature change contribution due to self-heating of the first device, if any, and multiple second temperature change contributions due to thermal coupling with multiple second devices and, particularly, multiple heat sources at specific locations on the frontside of the substrate.

Each second temperature change contribution can correspond to one of the second devices and can be calculated based on a specific imaginary heat amount to actual heat amount ratio. This specific imaginary heat amount to actual heat amount ratio can be acquired by the processor from the set of value for imaginary heat amount to actual heat amount ratios stored in memory, given the specific location of the second device. It should be noted that, given this specific imaginary heat amount to actual heat amount ratio, a specific imaginary heat amount can be found and used as a boundary condition and is predetermined with respect to a point off the backside of the substrate and, particularly, a point that is aligned vertically with the specific location of the second device and that is separated from the backside of the substrate by the same distance as the specific location of the second device.

As discussed above, all of the system and method embodiments for thermal modeling disclosed herein require the use of a set of imaginary heat amounts, which are predetermined employing thermal potential theory and using a test integrated circuit (IC) chip packaged in the same specific type of chip package as the IC chip at issue. Thus, also disclosed herein is a method for acquiring such a set of imaginary heat amounts.

Specifically, this method can comprise providing a test integrated circuit (IC) chip in a chip package. This test IC chip can comprise a substrate having a frontside and a backside opposite the frontside. The test IC chip can further comprise test devices at different locations on the frontside.

The method can further comprise selecting one of the test devices at a specific location on the frontside of the substrate to be a heat source for which a specific imaginary heat amount is to be calculated and at least two other test devices at other locations on the front side of the substrate to be temperature sensors, wherein the temperature sensors are separated from the heat source by different distances.

The method can further comprise biasing the heat source using a specific supply voltage. Specifically, the supply voltage used to bias the heat source can be a specific supply voltage that is sufficiently high to heat the heat source above the nominal temperature. It should be noted that a second supply voltage can be used to bias the other test devices (i.e., the sensors). However, this second supply voltage should be less than the supply voltage used to bias the heat source and, more specifically, should be sufficiently low so as to avoid self-heating of the sensors. The method can further comprise, during this biasing process, determining changes in temperature of the test devices (i.e., of the heat source and of each of the sensors) relative to the nominal temperature. The changes in temperature can be determined, for example, by measuring a performance attribute of each of the test devices (i.e., of the heat source and of each of the sensors), wherein the value of the performance attribute of a test device is indicative of the temperature of that test device.

Based on the changes in temperature of the test devices, a specific imaginary heat amount that is to be associated with the specific location of the heat source can be determined with respect to a point off the backside of the substrate, wherein this point is aligned vertically with the specific location of the heat source and separated from the backside of the substrate by the same distance as the specific location of the heat source.

The method can further comprise repeating these processes (i.e., the process of selecting a heat source, the process of biasing the heat source, the process of determining the changes in temperature of the heat source and sensors, and the process of determining a specific imaginary heat amount) in order to determine specific imaginary heat amounts to be associated with each of the different locations. Then, these imaginary heat amounts can be stored in memory so that they are usable for generating thermal models of localized temperature changes on a functional integrated circuit chip. It should be noted that such imagery heat amounts will only be usable for generating thermal models associated with integrated circuit chips having a substrate with the same thickness as that of the test IC chip and being packaged in the same type of chip package as that used for the test IC chip.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
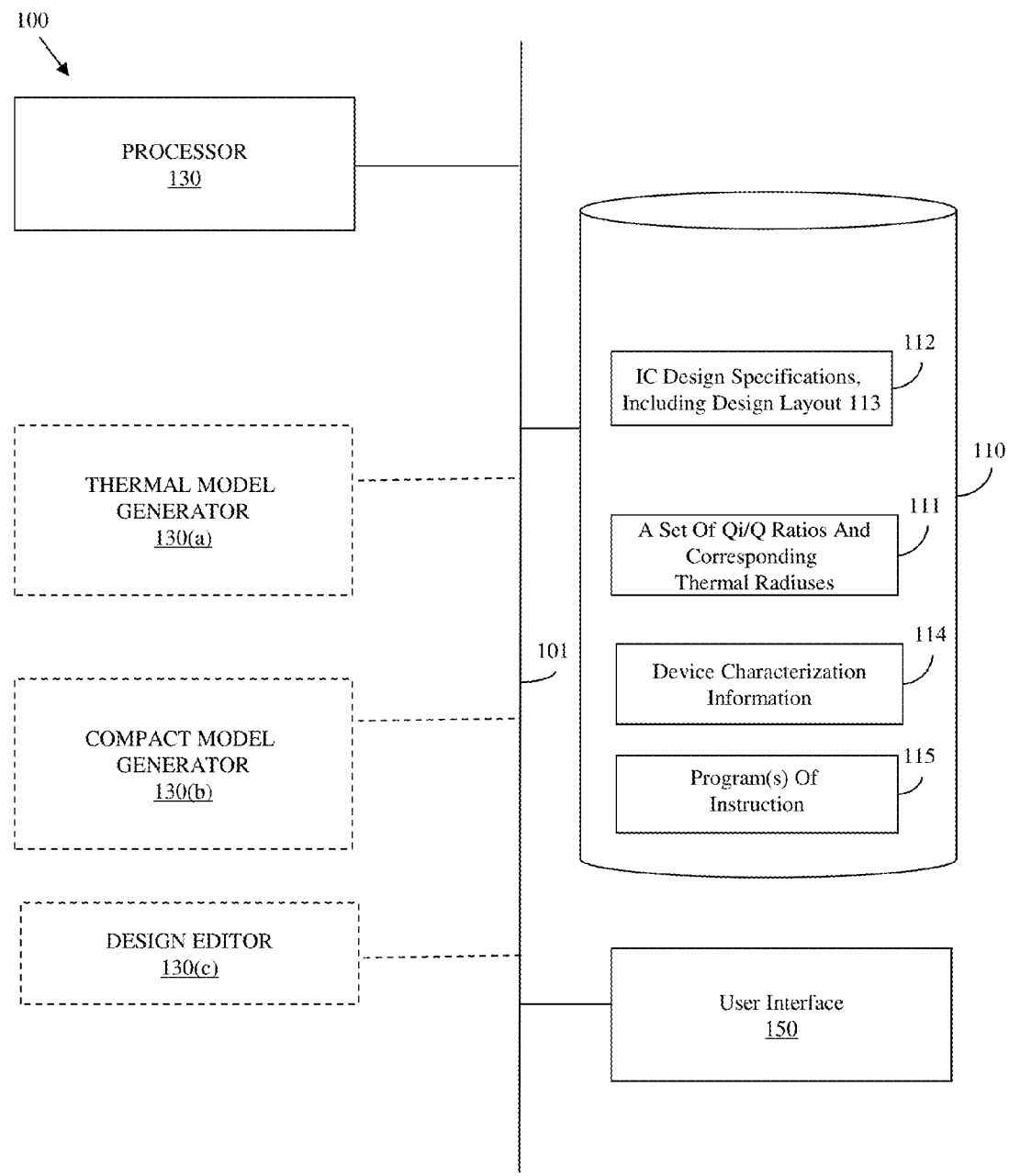
FIG. 1 is a schematic diagram illustrating a system for generating thermal models of devices on an IC chip.

As mentioned above, the performance of a device (e.g., a field effect transistor (FET), a bipolar transistor, a resistor, a capacitor, etc.) on an integrated circuit (IC) chip can vary as a function of temperature. The temperature of a device can vary due to the self-heating effect (SHE). The self-heating effect refers to heat generated by the device itself, when active. Those skilled in the art will recognize that there is a strong relationship between the supply voltage applied to a device when active and the temperature of that device. The temperature of a device can also vary due to the thermal coupling (i.e., due to the device's proximity to adjacent heat source(s), such as adjacent device(s)). Current modeling techniques provide for modeling localized temperature changes due to self-heating and due to thermal coupling with adjacent heat source(s). However, modeling of a localized temperature change due to thermal coupling typically involves calculations of thermal resistance along thermal pathways and such calculations can be quite complex, time consuming and oftentimes inaccurate. This is particularly true when heat removal (e.g., by convection or radiation) from the backside of IC chip contained in a package is inefficient such that the temperature distribution across the backside of the IC chip varies, changing the heat flow lines and, thereby changing the thermal resistances that need to be calculated. Therefore, there is a need in the art for a more efficient technique for modeling such localized temperature changes due to self-heating and thermal coupling.

In view of the foregoing, disclosed herein embodiments of a system and method for thermal modeling and, particularly, for modeling a temperature change of a device on a frontside of an integrated circuit (IC) chip due to self-heating, if any, and further due to thermal coupling with other device(s) on the frontside of the IC chip, given the possibility of inefficient heat removal from the backside of the IC chip. The embodiments avoid the need for calculations of thermal resistances by employing thermal potential theory. Specifically, in the embodiments, a boundary condition can be set off the backside of the IC chip. The boundary condition is analogous to an "image charge" used in electrostatics and is referred to herein as an imaginary heat amount. In order to implement the system and method, ratios of an imaginary heat amount to an actual heat amount for different locations on the IC chip must be predetermined using a test integrated circuit (IC) chip, which has multiple test devices at different locations and the same packaging solution as the IC chip at issue. During testing, one test device at one specific location on the test IC chip can be selected to function as a heat source, while the other test devices at other locations on the test IC chip function as temperature sensors. The heat source can be biased and changes in temperature at the heat source and at the sensors can be determined. These changes in temperature can then be used to calculate the value of the imaginary heat amount to actual heat amount ratio to be associated with the specific location. These processes can be repeated for all of the different locations and a set of such imaginary heat amount to actual heat amount ratios can then be stored in memory for use in thermal modeling.

More particularly, those skilled in the art will recognize that Fourier's Law (also referred to as the Law of Heat Conduction) describes the flow of heat (i.e., the flow of thermal energy) as a result of a temperature gradient and can be expressed using the following equation:

$$\frac{dQ}{dt} = -\kappa A \frac{dT}{dx}, \tag{1}$$

where κ is the thermal conductivity of the material through which the thermal conduction occurs, A is the area through which the thermal conduction occurs, and T is the temperature. Thermal capacitance (also referred to as heat capacitance) refers to the heat amount (Q) held by a material for a certain change of temperature and can be expressed using the following equation:

$$Q = mc\Delta T, \tag{2}$$

where m is the mass of the body, c is the specific heat (also referred to as the specific thermal capacitance) and ΔT is the change in temperature.

Similar equations are used to define the flow of electricity and electrical capacitance. Specifically, Ohm's Law for current density can be expressed using the following equation:

$$J = 1/\rho * E, \tag{3}$$

where J is the current density at a given location, ρ refers to the electrical resistivity of the material and is the reciprocal of the electrical conductivity (σ), and E is the electric field at the given location and can be expressed using the following equation:

$$E = -\frac{dV}{dx}, \tag{4}$$

where V is the voltage. Additionally, electrical capacitance can be expressed using the following equation:

$$q = C\Delta V, \tag{5}$$

where q is the stored amount of electric charge, C is the capacitance and ΔV is the change in voltage.

Given the similarities between the above-mentioned equations related to heat and to electricity, the technique disclosed herein for thermal modeling makes direct analogies between the variables contained in those equations. For example, thermal conductivity (κ) can be viewed as being analogous to the reciprocal of electrical resistivity (1/ρ), temperature (T) can be viewed as being analogous to voltage (V) and the amount of heat (Q) can be viewed as being analogous to the amount of electric charge (q). Furthermore, given these analogies and the fact that both heat flow and electric current flow follow the standard Continuity Equation, the technique disclosed herein for thermal modeling also proposes that other equations, which apply to electricity and incorporate such variables as electrical resistivity (ρ) (or electrical conductivity (σ)), voltage (V) and an amount of electric charge (q), can be rewritten to apply to heat simply by substituting in thermal conductivity (κ), temperature (T) and a heat amount (Q), respectively. For example, those skilled in the art will recognize that Laplace's equation applies to electricity and specifically defines a change in voltage (V) (i.e., a potential change) using the following equation:

$$\Delta V = \frac{q}{r_e}, \tag{6}$$

where q, as mentioned above, is an amount of electric charge and where $r_e$ is the distance from the location of the electric charge (q) to a location in space where the change in potential (ΔV) is measured. This location in space can be any location. Thus, the technique disclosed herein for thermal modeling proposes that the following equation can be used to define a change in temperature (T):

$$\Delta T = \frac{Q}{r}, \quad (7)$$

where Q is an amount of heat and r is the distance from the location of the heat amount (Q) to a location in space where the change in temperature (ΔT) is measured. This location in space can be any location. This equation (7) can specifically be applied to model the temperature change of a device on a frontside of an integrated circuit (IC) chip due to self-heating, if any, and further due to thermal coupling with other device(s) on the frontside of the IC chip. The technique disclosed herein for thermal modeling further proposes that the method of image charges (also known as the method of images or the method of mirror charges), which is a problem-solving tool that applies Laplace's equation in the field of electrostatics can, with modifications as described in detail below, be applied during such thermal modeling to account for inefficient heat removal from the backside of a substrate of an IC chip.

More particularly, referring to FIG. 1 disclosed herein are embodiments of a computer system 100 for generating a thermal model representing a temperature change of a device on a frontside of an integrated circuit (IC) chip due to self-heating, if any, and further due to thermal coupling with one or more other devices on the frontside of the IC chip. The system 100 can further provide for generating a compact model of the IC chip using the thermal model and redesigning the IC chip or the chip package, which allows the IC chip to be incorporated into a product, based on such models.

The computer system 100 can comprise at least one memory 110 (e.g., at least one computer readable storage medium, such as a computer readable storage device), a user interface 150 (e.g., a graphic user interface (GUI)) and at least one processor (e.g., 130 or 130(a)-(d), see detailed discussion below). Components of the system 100, including the processor(s), memory(ies) and GUI, can be interconnected over a system bus 101, as illustrated. Alternatively, any one or more of the components of the system 100 can communicate with any other component over a wired or wireless network.

The memory 110 can store program(s) 115 of instruction for performing the various processes described in detail below. The memory 110 can further store design specifications 112, including but not limited to, a design layout 113 for an IC chip and the packaging solution (i.e., the specific type of chip package) that will allow that IC chip to be incorporated into a product.

Figure 2:
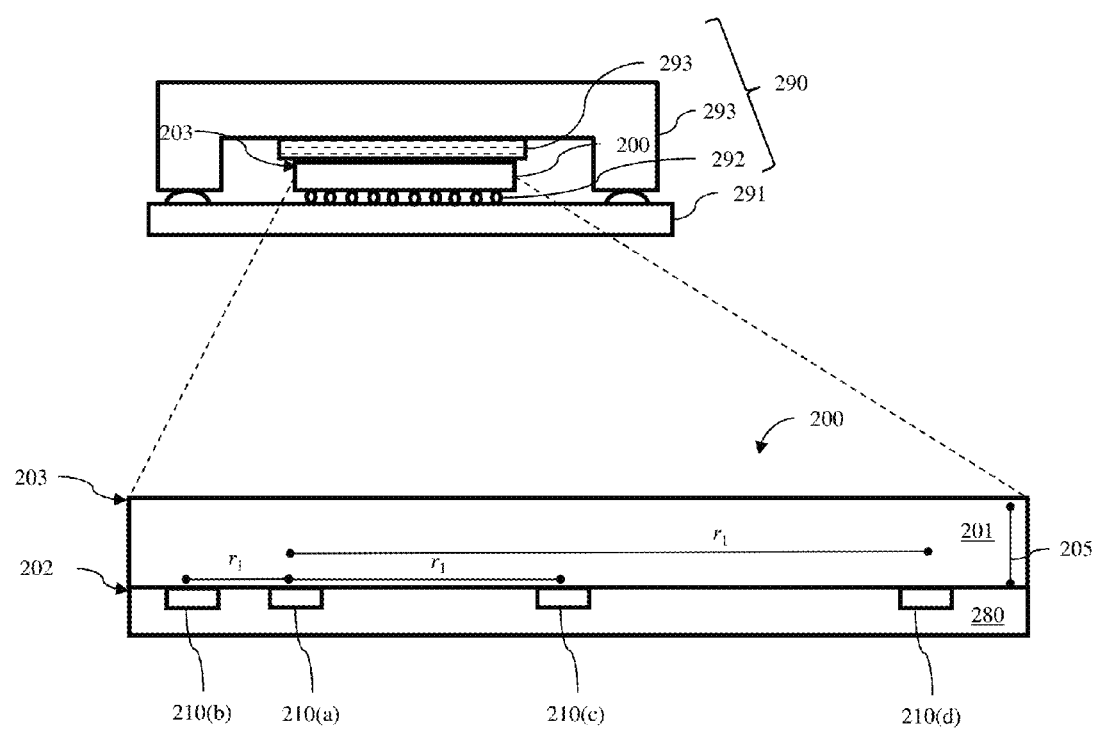
FIG. 2 is an exemplary design layout of an IC chips comprising devices that can be modeled using the disclosed system and method.

For example, the memory 110 can store design specifications 112 and design layout 113 for the exemplary IC chip 200, as shown in FIG. 2, including a packaging solution (i.e., a specific type of chip package) that will allow the IC chip 200 to be incorporated into a product. As shown in FIG. 2, the IC chip 200 is mounted on a chip carrier 291 (e.g., an organic laminate substrate) of a chip package 290. The IC chip 200 comprises a substrate 201 having a given thickness 205, a frontside 202 upon which various devices 210(a)-(d) are formed and a backside 203 opposite the frontside 202. For illustration purposes, four devices are shown; however, it should be understood that any number of two or more devices may be formed on the frontside 202 of the substrate 201. The devices 210(a)-(d) can comprise active devices (e.g., field effect transistors, bipolar transistors, etc. and/or passive devices (e.g., resistors, capacitors, inductors, etc.). The devices 210(a)-(d) can further be covered with inter-layer dielectric material and back end of the line (BEOL) metal wiring levels 280 that allow for interconnections between the device and also with the chip carrier 291. For purposes of illustration, the IC chip package 290 is shown as a "flip chip package". That is, the IC chip 200 is mounted on the chip carrier 291 with the frontside 202 of the substrate 201 facing the chip carrier 291 and solder joints 292 electrically connecting the metal wiring levels 280 to the chip carrier 291. A lid 293 covers the IC chip 200 and is also attached to the chip carrier 291. Optionally, a thermal compound (e.g., thermal paste, gel or grease) can fill the gap between the lid 293 and the backside 203 of the substrate 201 for purposes of heat removal. Alternatively, the IC chip package 290 can be a standard package (not shown) with the IC chip 200 mounted on the chip carrier 291 such that the backside of the IC chip 200 faces the chip carrier 291 and such that wires are used to make the required connection between the BEOL metal wiring levels 280 and the chip carrier 290. In any case, the IC chip package 290 can further be configured for attachment to a printed circuit board (PCB). That is, the flip-chip (or standard) IC chip package 290 can be configured as a through-hole package (e.g., a single in-line package, a dual-in line package, etc.) or, alternatively, as a surface mount package that provides the appropriate features for connection to a PCB.

The memory 110 can further store characterization information 114 for the various devices 210(a)-(d) on the IC chip. The characterization information 114 can include, but is not limited to self-heating characterization information associated with each of the devices 210(a)-(d), as discussed in greater detail below.

The memory 110 can further store a set 111 of values (X) for imaginary heat amount ($Q^i$) to actual heat amount (Q) ratios and corresponding effective thermal radiuses ($r_0$). The imaginary heat amounts ($Q^i$) in the ratios can be analogous to "image charges" used for problem solving in electrostatics. Those skilled in the art will recognize that the term "image charge" refers to an imaginary charge that is placed, for purposes of establishing a boundary condition, on one side of a conductive plate opposite an actual charge. The actual charge and "image charge" are equidistance from the conductive plate and the "image charge" mirrors the actual charge (i.e., is the polar opposite of an actual) such that the potential along the conductive plate must be zero. As discussed in greater detail below, in the technique for thermal modeling disclosed herein imaginary heat amounts ($Q^i$) will similarly be placed, for purposes of establishing a boundary condition, off the backside 203 of the substrate 201 of the IC chip 200 opposite an actual heat amount (Q) from a heat source. However, unlike image charges that mirror actual charges, these imaginary heat amounts ($Q^i$) will not necessarily mirror the actual heat amounts (Q) from the heat sources because of inefficient heat removal from the backside 203 of the substrate of the IC chip 200. Thus, the values (X) for imaginary heat amount ($Q^i$) to actual heat amount (Q) ratios in the set 111 must be predetermined using a test integrated circuit (IC) chip packaged in the same specific type of chip package as the IC chip 200 at issue and having the same substrate thickness (t) as the IC chip 200 at issue (see FIG. 7 and the detailed discussion below regarding the method for acquiring the values (X) for imaginary heat amount ($Q^i$) to actual heat amount (Q) ratios and corresponding effective thermal radiuses to be associated with specific locations on an IC chip).

In any case, the values (X) for imaginary heat amount ($Q^i$) to actual heat amount (Q) ratios and the corresponding effective thermal radiuses ($r_0$) in the set 111 can be associated with specific locations, respectively, of potential heat sources on the front side of the substrate. Specifically, each value (X) for an imaginary heat amount ($Q^i$) to actual heat amount (Q) ratio and corresponding effective thermal radius ($r_0$) can be associated with a specific location on the frontside of the substrate and can be predetermined with respect to a point for the imaginary heat amount ($Q^i$), which is off the backside of the substrate, aligned vertically with the specific location and separated from the backside of the substrate by the same distance as the specific location. It should be understood that a value (X) of an imaginary heat amount ($Q^i$) to actual heat amount (Q) ratio that is associated with a specific location indicates that the imaginary heat amount ($Q^i$) for that specific location will be some multiple X of the actual heat amount (Q) at the heat source at that specific location upon biasing. That is:

$$Q^i = XQ. \quad (8)$$

It should further be understood that the imaginary heat amount ($Q^i$) for a specific location will only be a mirror heat amount (i.e., will only be equal to $-1*Q$) when an area at the backside 203 of the substrate 201 and aligned vertically and equidistance between the heat source and the location of the imaginary heat amount ($Q^i$) is at the nominal temperature. Additionally, it should be noted that laboratory testing has shown that the thicker wafers (i.e., thicker substrates) tend to thermally couple to thermal chucks better than thinner wafers (i.e., thinner substrates and, thereby that the value (X) of the ratio $Q^i/Q$, which indicates the relationship between the imaginary heat amount ($Q^i$) and the actual heat amount (Q) for a particular location, will vary as a function of the thickness 205 of the substrate 201 and, particularly, will increase as the thickness of the substrate decreases. For example, in our laboratory testing we observe, for a substrate that is approximately 750 μm thick the value (X) of the ratio can be 4 (i.e., $Q^i/Q=+4$), whereas for a substrate that is approximately 100 μm thick the value (X) of the ratio can be 7.5 (i.e., $Q^i/Q=+7.5$). Thus, as discussed in greater detail below with regard to the method for acquiring the values (X) for the imaginary heat amount ($Q^i$) to actual heat amount (Q) ratios, these values must be acquired using a test IC chip with the same configuration (e.g., substrate thickness, chip packaging, etc.) as the IC chip at issue.

As mentioned above, the computer system 100 can comprise at least one processor. Specifically, the computer system 100 can comprise a single specialized processor 130 (e.g., a single specialized computer processing unit) that, during IC design, performs (i.e., that is adapted to perform, that is configured to perform and/or that executes multiple programs of instructions 115 to perform) multiple process steps, as described in detail below. Alternatively, the computer system 100 can comprise multiple specialized processors 130(a)-(c) (e.g., multiple different specialized computer processing units) and, during IC design, each processor can perform (i.e., can be adapted to perform, can be configured to perform and/or can execute one or more specific programs of instructions 115 to perform) one or more of the multiple process steps, as described in detail below. For purposes of illustration, three different special purpose processor(s) are shown in FIG. 1 including a thermal model generator 130(a), a compact model generator 130(b) and a design editor 130(c). It should be understood that FIG. 1 is not intended to be limiting and, alternatively, the multiple process steps, as described in detail below, can be performed by any number of one or more processors.

The computer system 100 can receive, e.g., from a user through the user interface 150, one or more inputs initiating thermal modeling with respect to a first device (e.g., device 210(a)) on the frontside 202 of the substrate 201 of the IC chip 200. Following receipt of the inputs, the processor 130 (or, if applicable, the thermal model generator 130(a)) can generate (i.e., can be adapted to generate, can be configured to generate, can execute a program 115 of instructions to generate, etc.) a thermal model that represents a total change in temperature of the first device 210(a), relative to a nominal temperature. Generation of such a thermal model can be based on geometric properties acquired from the design layout 113 and further based on one or more of the predetermined imaginary heat amounts selected from the set(s) 111 of predetermined imaginary heat amounts stored in memory 110.

Specifically, the processor 130 (or, if applicable the thermal model generator 130(a)) can acquire, from the design layout 113, geometric properties associated with the IC chip 200, with the first device 210(a) and with any second devices (e.g., devices 210(b)-(d)) that are also on the frontside 202 of the substrate 201 and that may thermally couple with the first device 210(a) during operation of the IC chip 200 so as to alter the temperature of the first device 210(a). The geometric properties can comprise at least the thickness (t) 205 of the substrate 201 of the IC chip 200 and first distances ($r_1$) between the center of the first device 210(a) and the centers of each of the second devices (e.g., devices 210(b)-(d)), respectively.

It should be noted that, optionally, the processor 130 (or, if applicable the thermal model generator 130(a)) can determine if any of the first distances ($r_1$) between the center of the first device 210(a) and the center of any of the second devices (e.g., the first distance between the center of the first device 210(a) and the center of the second device 210(b), the first distance between the center of the first device 210(a) and the center of the second device 210(c), or the first distance between the center of the first device 210(a) and the center of the second device 210(d)) are greater than a predetermined threshold distance required for thermal coupling and can remove from further consideration any second device that is separated from the first device by a first distance that is greater than the predetermined threshold distance. For example, if the first distances between the center of the first device 210(a) and the centers of both of the second devices 210(c) and 210(d) are greater than the predetermined threshold distance, then both of the second devices 210(c) and 210(d) can be removed from further consideration. In this case, only the second device 210(b) would be considered as a heat source during thermal modeling of the first device 210(a). However, if only the first distance between the center of the first device 210(a) and the center of the second device 210(d) is greater than the predetermined threshold distance, then only the second device 210(d) would be removed from further consideration. In this case, both the second devices 210(b) and 210(c) would still be considered heat sources during thermal modeling of the first device 210(a).

For the case where only one heat source (e.g., the second device 210(b)) is to be considered during thermal modeling of the device 210(a), the processor 130 (or, if applicable, the thermal model generator 130(a)) can calculate the total change in temperature of the first device 210(a) ($\Delta T_{1T}$) as the sum of a first temperature change contribution due to self-heating of the first device 210(a), if any, and a second temperature change contribution due to thermal coupling with the second device 210(b) as illustrated by the following equation:

$$\Delta T_{1T} = \Delta T_{1SH} + \Delta T_{1TC\text{-}2}, \quad (9)$$

where $\Delta T_{1SH}$ is a first temperature change contribution to the total change in temperature of the first device 210(a) due to self-heating of the first device 210(*a*) and $\Delta T_{1TC\text{-}2}$ is the second temperature change contribution to the total change in temperature of the first device 210(*a*) due to thermal coupling with the second device 210(*b*).

The first temperature change contribution ($\Delta T_{1SH}$) to the total change in temperature of the first device 210(*a*) due to self-heating of the first device 210(*a*) can be determined using device characterization techniques. Techniques used to characterize self-heating of a device (i.e., temperature changes of a device due to self-heating) based on performance are well known in the art. For example, a temperature-dependent performance attribute of a device (e.g., resistance of a resistor or any other temperature-dependent performance attribute of any other device) on a wafer can be measured at ambient temperature under low biasing conditions such that self-heating does not occur. Subsequently, the entire wafer can be heated (e.g., using a thermal chuck), thereby allowing the temperature-dependent performance attribute to be measured at one or more higher temperatures. Different performance measurements can be associated with different temperatures and stored in memory.

Subsequently, by measuring the performance of the device, the temperature can be determined.

The second temperature change contribution ($\Delta T_{1TC\text{-}2}$) to the total change in temperature of the first device 210(*a*) due to thermal coupling with the second device 210(*b*) can be calculated, as described in detail below, based on the change in temperature of the second device 210(*b*) due to self-heating ($\Delta T_{2SH}$) and by applying a technique similar to the method of image charges. More specifically, the second temperature change contribution ($\Delta T_{1TC\text{-}2}$) to the total change in temperature of the first device 210(*a*) due to thermal coupling with the second device 210(*b*) can be calculated based on self-heating of the second device 210(*b*) ($\Delta T_{2SH}$), which can be determined using device characterization techniques described above, and also based on a value (X) for a specific imaginary heat amount ($Q^i$) to actual heat amount (Q) ratio and a corresponding effective thermal radius ($r_0$), using equations (10)-(15) described in detail below.

Figure 3:
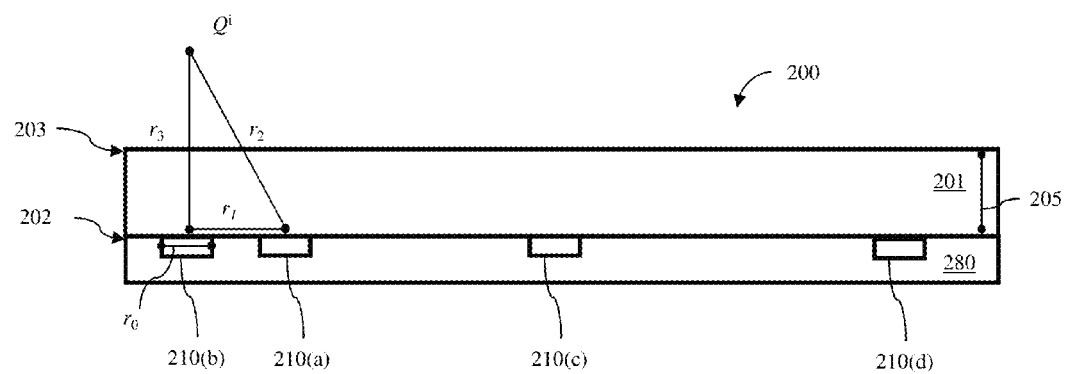
FIG. 3 is the design layout of FIG. 2 further showing a location of an imaginary heat amount off the backside of the substrate of the IC chip and associated with a specific location of a specific heat source.

A value (X) for a specific imaginary heat amount ($Q^i$) to actual heat amount (Q) ratio and the corresponding effect thermal radius ($r_0$) can be acquired by the processor 130 (or, if applicable, the thermal model generator 130(*a*)) from the set 111 stored in memory 110, given the specific location of the second device 210(*b*) on the IC chip. Given this value (X) for the specific imaginary heat amount ($Q^i$) to actual heat amount (Q) ratio and the corresponding effect thermal radius ($r_0$) associated with the specific location of the second device 210(*b*), a specific imaginary heat amount ($Q^i$) can used as a boundary condition at the specific point, as illustrated in FIG. 3, which is off the backside 203 of the substrate 201, aligned vertically with the center of the second device 210(*b*) and separated from the backside 203 of the substrate 201 by the same distance as the specific location of the specific second device 210(*b*). Specifically, the location of the first device 210(*a*) on the frontside of the substrate, the location of the second device 210(*b*) on the frontside of the substrate, and the location of the point off the backside of the substrate form a right triangle. In this right triangle, the centers of the first device 210(*a*) and the second device 210(*b*) are separated by the first distance ($r_1$), the centers of the point and the first device 210(*a*) are separated by a second distance ($r_2$), and the centers the second device 210(*b*) and the point are separated by a third distance ($r_3$). As mentioned above, the specific location of the second device 210(*b*) and the location of the point can each be separated from the backside 203 of the substrate 201 by the same distance. Since the specific location of the second device 210(*b*) is on the frontside 202 of the substrate 201, it is separated from the backside 203 of the substrate 201 by a distance that is equal to the thickness 205 of the substrate 201. Since the specific location of the second device 210(*b*) and the location of the point off the backside of the substrate are separated from the backside 203 of the substrate 201 by the same distance, the processor 130 (or, if applicable, the thermal model generator 130(*a*)) can calculate that third distance ($r_3$) as being equal to two times the thickness 205 of the substrate 201. Furthermore, the processor 130 (or, if applicable, the thermal model generator 130(*a*)) can calculate the second distance ($r_2$) between the first device 210(*a*) and the point off the backside of the substrate, using the equations (10)-(11) below:

$$r_2^2 = r_1^2 + r_3^2, \text{ and} \qquad (10)$$

$$r_2 = \sqrt{r_1^2 + r_3^2} = \sqrt{r_1^2 + 4 * t^2}. \qquad (11)$$

The processor 130 (or, if applicable, the thermal model generator 130(*a*)) can then calculate the second temperature change contribution ($\Delta T_{1TC\text{-}2}$) to the total change in temperature of the first device 210(*a*) due to thermal coupling with the second device 210(*b*) using equations (12)-(15) below. Specifically, equation (12) indicates that the second temperature change contribution ($\Delta T_{1TC\text{-}2}$) to the total change in temperature of the first device 210(*a*) due to thermal coupling with the second device 210(*b*) will be equal to the sum of a first ratio of the heat amount ($Q_2$) at the second device 210(*b*) over the first distance ($r_1$) and a second ratio of the specific imaginary heat amount ($Q^i$) over the second distance ($r_2$). That is, $$\Delta T_{1TC-2} = \frac{Q_2}{r_1} + \frac{Q^i}{r_2}. \qquad (12)$$

Equation (12) can be simplified as follows given equation (8) above:

$$\Delta T_{1TC-2} = \frac{Q_2}{r_1} + X * \frac{Q_2}{\sqrt{r_1^2 + 4 * t^2}} = Q_2 * \left( \frac{1}{r1} + \frac{X}{\sqrt{r_1^2 + 4 * t^2}} \right). \qquad (13)$$

Equation (13) can further simplified as follows in order to eliminate the need to actually find the amount of heat ($Q_2$) at the second device 210(*b*) or the imaginary heat amount ($Q^i$) at the point off the backside of the substrate:

$$\Delta T_{2SH} = Q_2 * \left( \frac{1}{r_0} + \frac{X}{\sqrt{r_0^2 + 4 * t^2}} \right), \text{ and} \qquad (14)$$

$$\Delta T_{1TC-2} = \Delta T_{2SH} * \left( \frac{1}{r_1} + \frac{X}{\sqrt{r_1^2 + 4 * t^2}} \right) / \left( \frac{1}{r_0} + \frac{X}{\sqrt{r_0^2 + 4 * t^2}} \right), \qquad (15)$$

where $r_0$ is the effective thermal radius of that second device 210(*b*). It should be noted that in solving equation (15) the value for the effective thermal radius ($r_0$) should be predetermined so that equation (14) is valid and, thereby so that the self-heating of the heat source (i.e., the second device 210(b)) follows the thermal potential theory in that it is the increase in temperature due to an amount of heat ($Q_2$) at that heat source.

For the case where multiple heat sources (e.g., the second device 210(b) and the second device 210(c)) are to be considered during thermal modeling of the device 210(a), the processor 130 (or, if applicable, the thermal model generator 130(a)) can calculate the total change in temperature of the first device 210(a) ($\Delta T_{1T}$) as the sum of a first temperature change contribution due to self-heating of the first device 210(a), if any, and second temperature change contributions due to thermal coupling with each of the second devices (e.g., second devices 210(b) and 210(c)), respectively, as illustrated by the following equation:

$$\Delta T_{1T} = \Delta T_{1SH} + \Sigma \Delta T_{1TC-n}, \quad (16)$$

where $\Delta T_{1SH}$ is a first temperature change contribution to the total change in temperature of the first device 210(a) due to self heating of the first device 210(a) and each $\Delta T_{1TC-n}$ is a second temperature change contribution to the total change in temperature of the first device 210(a) due to thermal coupling with a given second device.

The first temperature change contribution ($\Delta T_{1SH}$) can be calculated in the same manner as described in detail above (e.g., using device characterization techniques).

Figure 4:
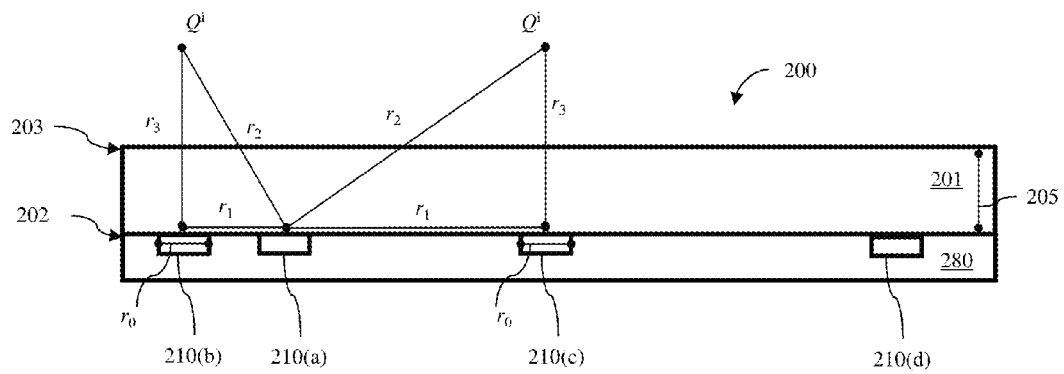
FIG. 4 is the design layout of FIG. 4 further showing multiple locations of multiple imaginary heat amounts off the backside of the substrate of the IC chip and associated with different locations of different heat sources, respectively.

Each second temperature change contribution ($\Delta T_{1TC-n}$) can be calculated by the processor 130 (or, if applicable, the thermal model generator 130(a)) in isolation. That is, each second temperature change contribution ($\Delta T_{1TC-n}$) associated with each second device 210(b) and 210(c) at issue (i.e., $\Delta T_{1TC-210(b)}$ and $\Delta T_{1TC-210(c)}$) can be calculated by the processor 130 (or, if applicable, the thermal model generator 130(a)) independently of the contribution from any other second device. Thus, referring to FIG. 4, a second temperature change contribution to the total change in temperature of the first device 210(a) due to thermal coupling with the second device 210(b) ($\Delta T_{1TC-210(b)}$) can be calculated in the exact same manner, as described above, using equations (9)-(15). Then, an additional second temperature change contribution to the total change in temperature of the first device 210(a) due to thermal coupling with the second device 210(c) ($\Delta T_{1TC-210(c)}$) can be calculated in essentially the same manner. However, it should be understood that the values for the second distance ($r_2$) and the specific imaginary heat amount to actual heat amount ratio that are used to calculate this additional second temperature change contribution ($\Delta T_{1TC-210(c)}$) from the second device 210(c) may be different than the values for the second distance ($r_2$) and the specific imaginary heat amount to actual heat amount ratio that were used to calculate the second temperature contribution ($\Delta T_{1TC-210(b)}$) from the second device 210(b). The second distances will be different if, as illustrated in FIG. 4, the first distances ($r_1$) between the center of the first device 210(a) and the centers of the second devices 210(b) and 210(c) are different. The specific imaginary heat amount to actual heat amount ratios associated with the specific locations of the second devices 210(b) and 210(c), respectively, may be different depending upon the specific locations of those devices on the frontside of the substrate (see the flow diagram of FIG. 7 and the detailed discussion thereof below).

The processor 130 (or, if applicable, the thermal model generator 130(a)) can iteratively repeat the above-described processes to generate thermal models for each of the devices 210(a)-210(d) on the frontside 202 of the IC chip 200.

Next, the processor 130 (or, if applicable, the compact model generator 130(b)) can generate (i.e., can be adapted to generate, can be configured to generate, can execute a program 115 of instructions to generate, etc.) a compact model that models the performance of IC chip 200 using such thermal models.

Based on the modeled performance of the IC chip 200, as indicated by the compact model, the processor 130 (or, if applicable, the design editor 130(c)) can make adjustments to the design specifications 112 of the IC chip 200, including to the design layout 113 of the IC chip 200 and/or to the packaging solution for that IC chip 200. For example, the processor 130 (or, if applicable, the design editor 130(c)) can adjust the layout of the devices 210(a)-(d) on the IC chip 200, moving the devices closer together or farther apart in order to adjust the operating temperature of the one or more of the devices and, thereby to adjust the performance of one or more of the devices. Additionally or alternatively, the processor 130 (or, if applicable, the design editor 130(c)) can change the specification for the thickness 205 of the substrate 201 of the IC chip 200, making it thicker or thinner in order to adjust the operating temperature of the one or more of the devices and, thereby to adjust the performance of one or more of the devices. Additionally or alternatively, the processor 130 (or, if applicable, the design editor 130(c)) can change the specifications for the chip package, making it a more or less effective heat sink in order to adjust the operating temperature of the one or more of the devices and, thereby to adjust the performance of one or more of the devices.

The processor 130 (or, if applicable, the thermal model generator 130(a), compact model generator 130(b) and design editor 130(c)) can iteratively repeat the above-described processes in order to generate a final design for the IC chip 200. The IC chip 200 can subsequently be manufactured according to the final design.

Figure 5:
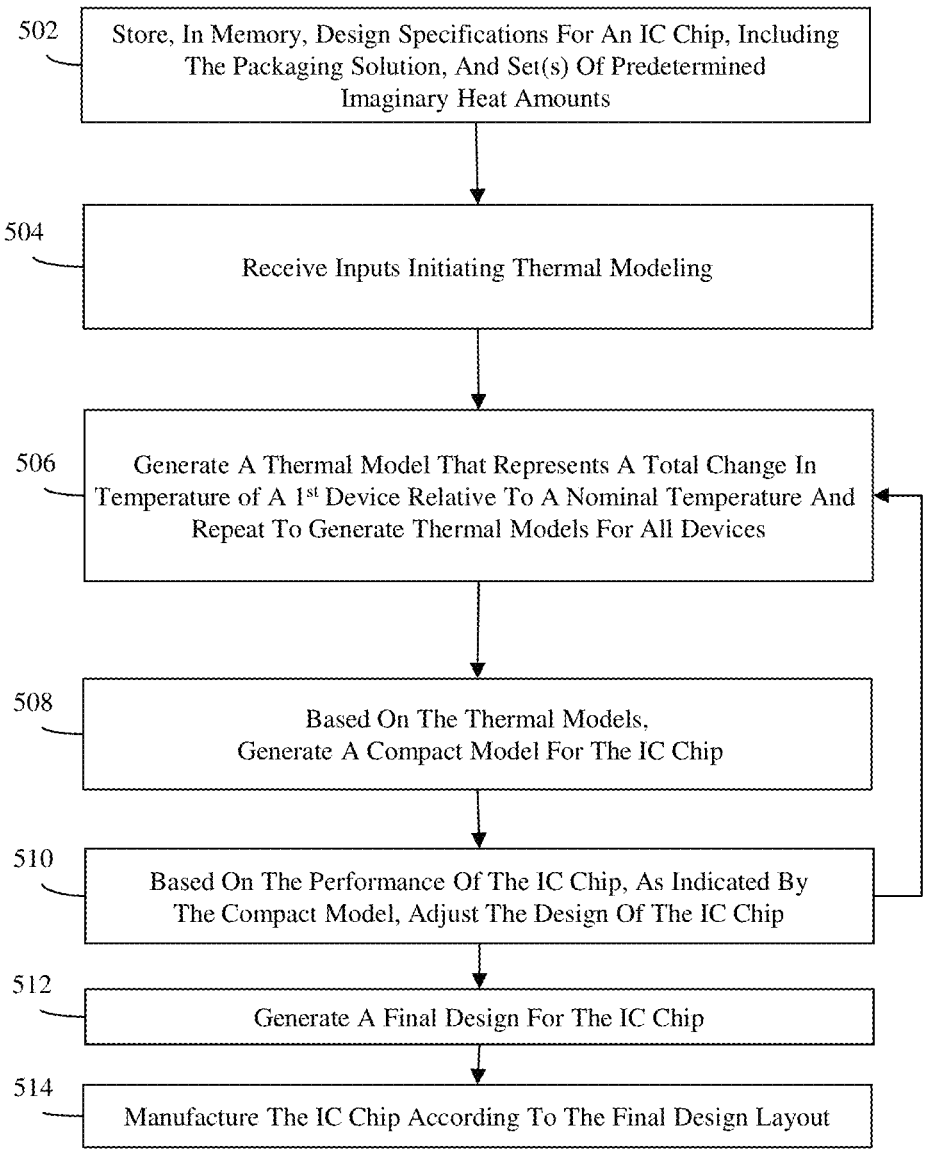
FIG. 5 is a flow diagram illustrating a method for generating thermal models of devices on an IC chip.

Referring to the flow diagram of FIG. 5 in combination with FIG. 1, also disclosed herein are embodiments of a method for generating a thermal model representing a temperature change of a device on a frontside of an integrated circuit (IC) chip due to self-heating, if any, and further due to thermal coupling with one or more other devices on the frontside of the IC chip. The method can further provide for generating a compact model of the IC chip using the thermal model and redesigning the IC chip or the chip package, which allows the IC chip to be incorporated into a product, based on such models.

The method can comprise storing, in at least one memory 110 (e.g., at least one computer readable storage medium, such as a computer readable storage device), program(s) and information required for implementing the method (502). Specifically, the method can comprise storing, in the memory 110, program(s) 115 of instruction for performing the various processes described in detail below. The method can comprise storing, in the memory 110, design specifications 112, including but not limited to, a design layout 113 for an IC chip and the packaging solution (i.e., the specific type of chip package) that will allow that IC chip to be incorporated into a product (e.g., see the exemplary IC chip 200 shown in FIG. 2 and described in detail above with regard to the system embodiments). The method can comprise storing, in the memory 110, characterization information 114 for the various devices 210(a)-(d) on the IC chip. The characterization information 114 can include, but is not limited to self-heating characterization information associated with each of the devices 210(a)-(d), as discussed in greater detail below. The method can comprise storing, in the memory 110, a set 111 of values (X) for imaginary heat amount ($Q^i$) to actual heat amount (Q) ratios and corresponding effective thermal radiuses ($r_0$).

In the technique for thermal modeling disclosed herein imaginary heat amounts (like "image charges") will be placed, for purposes of establishing a boundary condition, off the backside 203 of the substrate 201 of the IC chip 200 opposite an actual heat amount (Q) from a heat source. However, unlike image charges that mirror actual charges, these imaginary heat amounts will not necessarily mirror the actual heat amounts from the heat sources because of inefficient heat removal from the backside 203 of the substrate of the IC chip 200. Thus, the values of the imaginary heat amount to actual heat amount ratios that are stored in memory 110 must be predetermined using a test integrated circuit (IC) chip packaged in the same specific type of chip package as the IC chip 200 at issue and having the same substrate thickness (t) as the IC chip 200 at issue (see FIG. 7 and the detailed discussion below regarding the method for acquiring imaginary heat amounts).

In any case, the values (X) for imaginary heat amount ($Q^i$) to actual heat amount (Q) ratios and the corresponding effective thermal radiuses ($r_0$) in the set 111 can be associated with specific locations, respectively, of potential heat sources on the front side of the substrate. Specifically, each value (X) for an imaginary heat amount ($Q^i$) to actual heat amount (Q) ratio and corresponding effective thermal radius ($r_0$) can be associated with a specific location on the frontside of the substrate and can be predetermined with respect to a point for the imaginary heat amount ($Q^i$), which is off the backside of the substrate, aligned vertically with the specific location and separated from the backside of the substrate by the same distance as the specific location. It should be understood that a value (X) of an imaginary heat amount ($Q^i$) to actual heat amount (Q) ratio that is associated with a specific location indicates that the imaginary heat amount ($Q^i$) for that specific location will be some multiple X of the actual heat amount (Q) at the heat source at that specific location upon biasing (see equation (8) above). It should further be understood that the imaginary heat amount ($Q^i$) for a specific location will only be a mirror heat amount (i.e., will only be equal to −1*Q) when an area at the backside 203 of the substrate 201 and aligned vertically and equidistance between the heat source and the location of the imaginary heat amount ($Q^i$) is at the nominal temperature. Additionally, it should be noted that laboratory testing has shown that the thicker wafers (i.e., thicker substrates) tend to thermally couple to thermal chucks better than thinner wafers (i.e., thinner substrates and, thereby that the value (X) of the ratio $Q^i/Q$, which indicates the relationship between the imaginary heat amount ($Q^i$) and the actual heat amount (Q) for a particular location, will vary as a function of the thickness 205 of the substrate 201 and, particularly, will increase as the thickness of the substrate decreases. For example, in our laboratory testing we observe, for a substrate that is approximately 750 μm thick the value (X) of the ratio can be 4 (i.e., $Q^i/Q=+4$), whereas for a substrate that is approximately 100 μm thick the value (X) of the ratio can be 7.5 (i.e., $Q^i/Q=+7.5$). Thus, as discussed in greater detail below with regard to the method for acquiring the values (X) for the imaginary heat amount ($Q^i$) to actual heat amount (Q) ratios, these values must be acquired using a test IC chip with the same configuration (e.g., substrate thickness, chip packaging, etc.) as the IC chip at issue.

The method can comprise receiving, e.g., from a user through the user interface 150, one or more inputs initiating thermal modeling with respect to a first device (e.g., device 210(a)) on the frontside 202 of the substrate 201 of the IC chip 200 (504). Following receipt of the inputs, the method can comprise generating, e.g., by a processor 130 or, if applicable, by a thermal model generator 130(a), a thermal model that represents a total change in temperature of the first device 210(a), relative to a nominal temperature (506). Generation of such a thermal model at process 506 can be based on geometric properties acquired from the design layout 113 and further based on one or more of the predetermined imaginary heat amount to actual heat amount ratios and corresponding thermal radiuses selected from the set 111.

Figure 6:
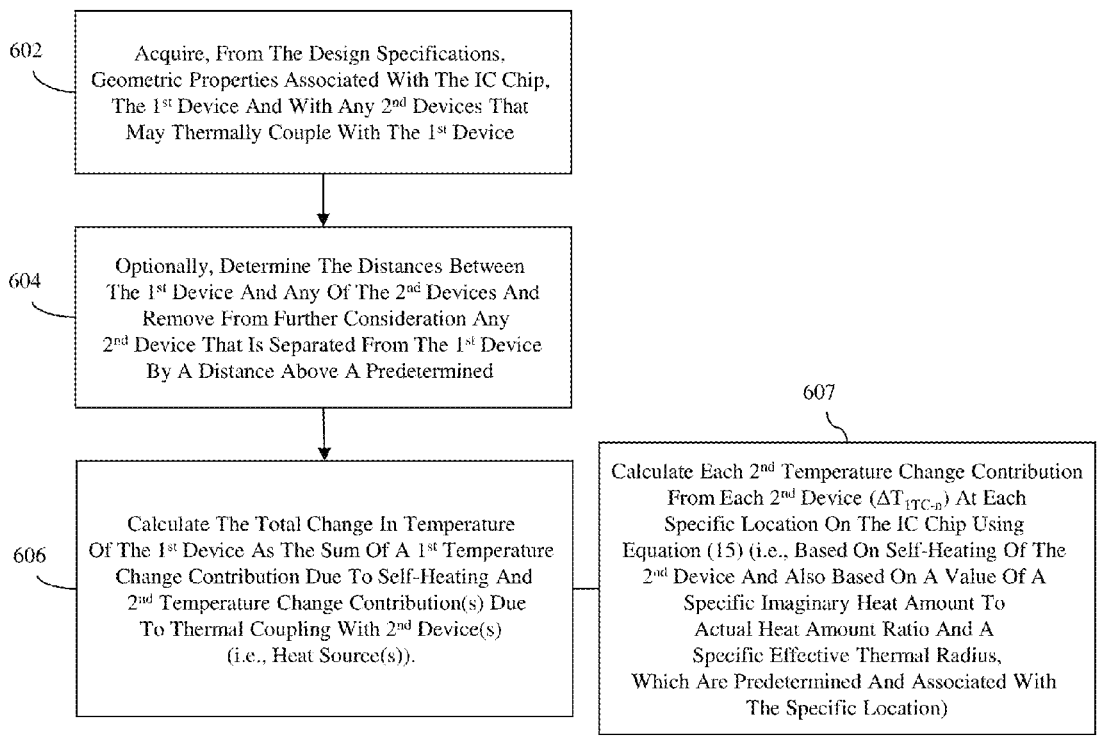
FIG. 6 is a flow diagram further illustrating process 506 of FIG. 5.

FIG. 6 is a flow diagram that describes in greater detail the processes used to generate a thermal model at process 506. For illustration purposes, these processes are described below with respect to the first device 210(a) on the frontside 202 of the substrate 201 of the IC chip 200 of FIG. 2. To generate such a thermal model, geometric properties, which are associated with the IC chip 200, with the first device 210(a) and with any second devices (e.g., devices 210(b)-(d)) that are also on the frontside 202 of the substrate 201 and that may thermally couple with the first device 210(a) during operation of the IC chip 200 so as to alter the temperature of the first device 210(a), can be acquired from the design specifications 112, including the design layout 113, in the memory 110 (602). The geometric properties can comprise at least the thickness (t) 205 of the substrate 201 of the IC chip 200 and first distances ($r_1$) between the first device 210(a) and each of the second devices (e.g., devices 210(b)-(d)), respectively.

Optionally, a determination can be made (e.g., by the processor 130 or, if applicable, by the thermal model generator 130(a)) as to whether any of first distances ($r_1$) between the center of the first device 210(a) and the centers of any of the second devices (e.g., the first distance between the center of the first device 210(a) and the center of the second device 210(b), the first distance between the center of the first device 210(a) and the center of the second device 210(c), or the first distance between the center of the first device 210(a) and the center of the second device 210(d)) are greater than a predetermined threshold distance required for thermal coupling and can remove from further consideration any second device that is separated from the first device by a first distance that is greater than the predetermined threshold distance (604). For example, if the first distances between the center first device 210(a) and the centers of both of the second devices 210(c) and 210(d) are greater than the predetermined threshold distance, then both of the second devices 210(c) and 210(d) can be removed from further consideration. In this case, only the second device 210(b) would be considered as a heat source during thermal modeling of the first device 210(a). However, if only the first distance between the center of the first device 210(a) and the center of the second device 210(d) is greater than the predetermined threshold distance, then only the second device 210(d) would be removed from further consideration. In this case, both the second devices 210(b) and 210(c) would still be considered heat sources during thermal modeling of the first device 210(a).

Next, the total change in temperature of the first device 210(a) can be calculated (606). For the case where a single heat sources (e.g., the second device 210(b)) thermally couples with the first device 210(a), the total change in temperature of the first device 210(a) ($\Delta T_{1T}$) can be calculated as the sum of a first temperature change contribution due to self-heating of the first device 210(a), if any, and a second temperature change contribution due to thermal coupling with the second device 210(*b*), as illustrated by equation (9) and discussed in detail above.

The first temperature change contribution ($\Delta T_{1SH}$) to the total change in temperature of the first device 210(*a*) due to self-heating of the first device 210(*a*), if any, can be calculated in the same manner as described in detail above (e.g., using device characterization techniques).

The second temperature change contribution ($\Delta T_{1TC-2}$) to the total change in temperature of the first device 210(*a*) due to thermal coupling with the second device 210(*b*) can be calculated, as described in detail above, based on the change in temperature of the second device 210(*b*) due to self-heating ($\Delta T_{2SH}$) and by applying a technique similar to the method of image charges. More specifically, the second temperature change contribution ($\Delta T_{1TC-2}$) to the total change in temperature of the first device 210(*a*) due to thermal coupling with the second device 210(*b*) can be calculated based on self-heating of the second device 210(*b*) ($\Delta T_{2SH}$), which can be determined using device characterization techniques described above, and also based on a value (X) for a specific imaginary heat amount ($Q^i$) to actual heat amount (Q) ratio and a corresponding effective thermal radius ($r_0$), using equations (10)-(15).

That is, a value (X) for a specific imaginary heat amount ($Q^i$) to actual heat amount (Q) ratio and the corresponding effect thermal radius ($r_0$) can be acquired (e.g., by the processor 130 or, if applicable, by the thermal model generator 130(*a*)) from the set 111 stored in memory 110, given the specific location of the second device 210(*b*) on the IC chip. Given this value (X) for the specific imaginary heat amount ($Q^i$) to actual heat amount (Q) ratio and the corresponding effect thermal radius ($r_0$) associated with the specific location of the second device 210(*b*), a specific imaginary heat amount ($Q^i$) can used as a boundary condition at the specific point, as illustrated in FIG. 3, which is off the backside 203 of the substrate 201, aligned vertically with the center of the second device 210(*b*) and separated from the backside 203 of the substrate 201 by the same distance as the specific location of the specific second device 210(*b*). Specifically, the location of the first device 210(*a*) on the frontside of the substrate, the location of the second device 210(*b*) on the frontside of the substrate, and the location of the point off the backside of the substrate form a right triangle. In this right triangle, the centers of the first device 210(*a*) and the second device 210(*b*) are separated by the first distance ($r_1$), the centers of the point and the first device 210(*a*) are separated by a second distance ($r_2$), and the centers the second device 210(*b*) and the point are separated by a third distance ($r_3$). As mentioned above, the specific location of the second device 210(*b*) and the location of the point can each be separated from the backside 203 of the substrate 201 by the same distance. Since the specific location of the second device 210(*b*) is on the frontside 202 of the substrate 201, it is separated from the backside 203 of the substrate 201 by a distance that is equal to the thickness 205 of the substrate 201. Since the specific location of the second device 210(*b*) and the location of the point off the backside of the substrate are separated from the backside 203 of the substrate 201 by the same distance, that third distance ($r_3$) can be calculated (e.g., by the processor 130 or, if applicable, by the thermal model generator 130(*a*)) as being equal to two times the thickness 205 of the substrate 201. Furthermore, the second distance ($r_2$) between the first device 210(*a*) and the point off the backside of the substrate can be calculated (e.g., by the processor 130 or, if applicable, by the thermal model generator 130(*a*)) using the equations (10)-(11) discussed in detail above with regard to the system.

Next, the second temperature change contribution ($\Delta T_{1TC-2}$) to the total change in temperature of the first device 210(*a*) due to thermal coupling with the second device 210(*b*) can be calculated (e.g., by the processor 130 or, if applicable, by the thermal model generator 130(*a*)) using equations (12)-(15) below. Specifically, equation (12) indicates that the second temperature change contribution ($\Delta T_{1TC-2}$) to the total change in temperature of the first device 210(*a*) due to thermal coupling with the second device 210(*b*) will be equal to the sum of a first ratio of the heat amount ($Q_2$) at the second device 210(*b*) over the first distance ($r_1$) and a second ratio of the specific imaginary heat amount ($Q^i$) over the second distance ($r_2$). As described in detail above, equation (12) is further simplified into equation (13) using equation (8) and equation (13) is further simplified into equation (15), thereby eliminating the need to actually find the amount of heat ($Q_2$) at the second device 210(*b*) or the imaginary heat amount ($Q^i$) at the point off the backside of the substrate, when the value (X) for the specific imaginary heat amount ($Q^i$) to actual heat amount (Q) ratio and the corresponding effective thermal radius ($r_0$) associated with the specific location of the second device 210(*b*) are known.

For the case where multiple heat sources (e.g., the second device 210(*b*) and the second device 210(*c*)) thermally couple with the first device 210(*a*), the total change in temperature of the first device 210(*a*) ($\Delta T_{1T}$) can be calculated as the sum of a first temperature change contribution due to self-heating of the first device 210(*a*), if any, and second temperature change contributions due to thermal coupling with each of the second devices (e.g., second devices 210(*b*) and 210(*c*)), respectively, as illustrated by equation (16) and discussed in detail above.

The first temperature change contribution ($\Delta T_{1SH}$) to the total change in temperature of the first device 210(*a*) due to self-heating of the first device 210(*a*), if any, can be calculated in the same manner as described in detail above (e.g., using device characterization techniques).

Each second temperature change contribution ($\Delta T_{1TC-n}$) can be calculated in isolation. That is, each second temperature change contribution ($\Delta T_{1TC-n}$) associated with each second device 210(*b*) and 210(*c*) at issue (i.e., $\Delta T_{1TC-210(b)}$ and $\Delta T_{1TC-210(c)}$) can be calculated independently of the contribution from any other second device. Thus, referring to FIG. 4, a second temperature change contribution to the total change in temperature of the first device 210(*a*) due to thermal coupling with the second device 210(*b*) ($\Delta T_{1TC-210(b)}$) can be calculated in the exact same manner, as described above, using equations (9)-(15). Then, an additional second temperature change contribution to the total change in temperature of the first device 210(*a*) due to thermal coupling with the second device 210(*c*) ($\Delta T_{1TC-210(c)}$) can be calculated in essentially the same manner. However, it should be understood that the values for the second distance ($r_2$) and the specific imaginary heat amount to actual heat amount ratio that are used to calculate this additional second temperature change contribution ($\Delta T_{1TC-210(c)}$) from the second device 210(*c*) may be different than the values for the second distance ($r_2$) and the specific imaginary heat amount to actual heat amount ratio that were used to calculate the second temperature contribution ($\Delta T_{1TC-210(b)}$) from the second device 210(*b*). The second distances will be different if, as illustrated in FIG. 4, the first distances ($r_1$) between the center of the first device 210(*a*) and the centers of the second devices 210(*b*) and 210(*c*) are different. The specific imaginary heat amount to actual heat amount ratios associated with the specific locations of the second devices 210(*b*) and 210(c), respectively, may be different depending upon the specific locations of those devices on the frontside of the substrate (see the flow diagram of FIG. 7 and the detailed discussion thereof below).

Referring again to FIG. 5, the processes described above and set forth in FIG. 6 can be iteratively repeated (e.g., by the processor 130 or, if applicable, by the thermal model generator 130(a)) to generate thermal models for each of the devices 210(a)-210(d) on the frontside 202 of the IC chip 200.

Next, a compact model that models the performance of the IC chip 200 can be generated (e.g., by the processor 130 or, if applicable, by the compact model generator 130(b)) (508). This compact model can specifically be generated using the thermal models generated at process 506.

Based on the modeled performance of the IC chip 200, as indicated by the compact model, adjustments can be made (e.g., by the processor 130 or, if applicable, by the design editor 130(c)) to the design specifications 112 of the IC chip 200, including to the design layout 113 of the IC chip 200 and/or to the packaging solution for that IC chip 200 (510). For example, the layout of the devices 210(a)-(d) on the IC chip 200 can be adjusted, moving the devices closer together or farther apart in order to adjust the operating temperature of the one or more of the devices and, thereby to adjust the performance of one or more of the devices. Additionally or alternatively, the specification for the thickness 205 of the substrate 201 of the IC chip 200 can be adjusted, making it thicker or thinner in order to adjust the operating temperature of the one or more of the devices and, thereby to adjust the performance of one or more of the devices. Additionally or alternatively, the specifications for the chip package can be adjusted, making it a more or less effective heat sink in order to adjust the operating temperature of the one or more of the devices and, thereby to adjust the performance of one or more of the devices.

Processes 506-510 can be iteratively repeated in order to generate a final design for the IC chip 200 (512). Then, the IC chip 200 can be manufactured according to the final design (514).

As discussed above, all of the system and method embodiments for thermal modeling disclosed herein require the use of a set of imaginary heat amounts, which are predetermined employing thermal model potential theory and using a test integrated circuit (IC) chip packaged in the same specific type of chip package as the IC chip at issue. Thus, also disclosed herein is a method for acquiring such a set of values (X) for imaginary heat amount ($Q^r$) to actual heat amount (Q) ratios and corresponding effective thermal radiuses ($r_0$) associated with different locations, respectively on the IC chip.

Figure 7:
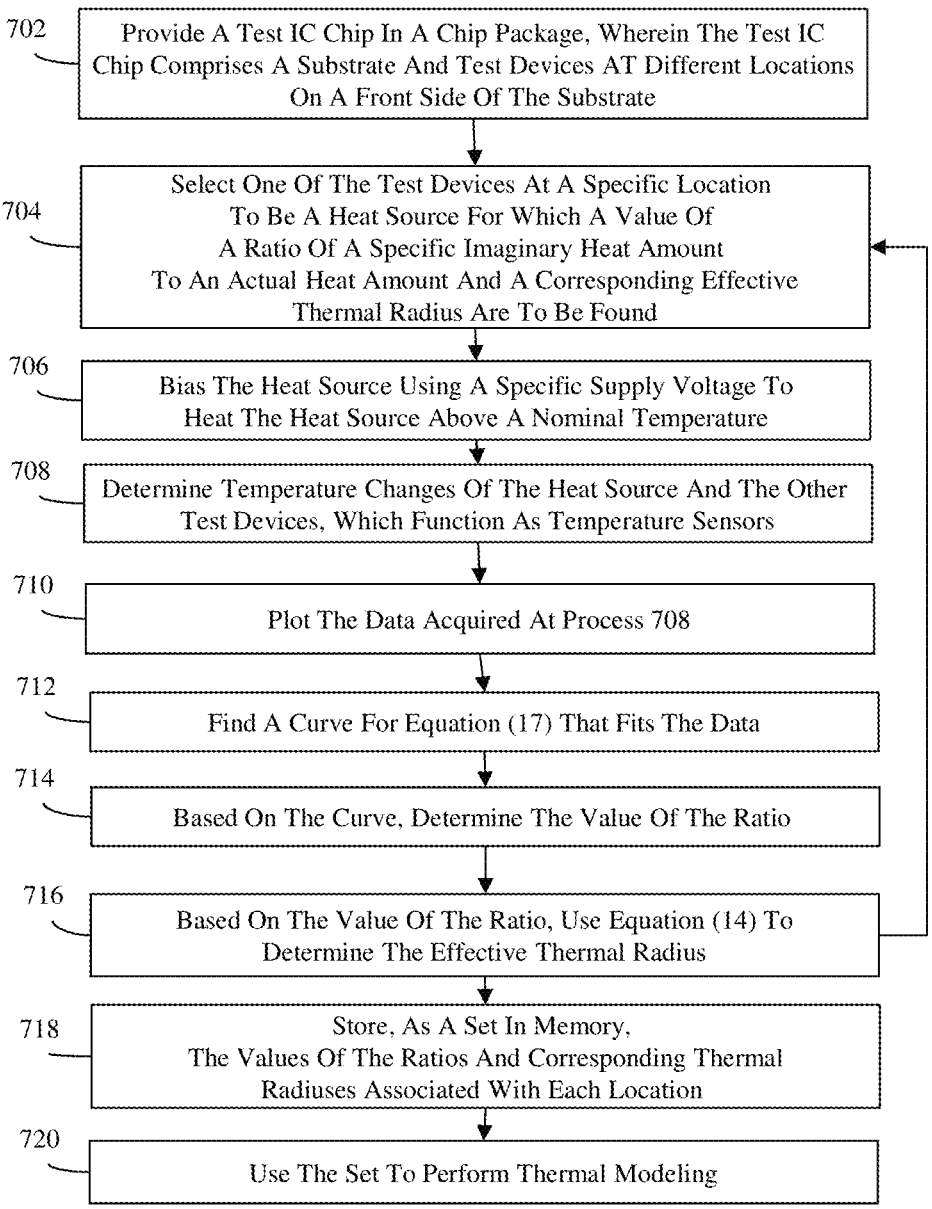
FIG. 7 is a flow diagram illustrating a method for acquiring values (X) for imaginary heat amount ($Q^i$) to actual heat amount (Q) ratios and corresponding effective thermal radiuses to be associated with specific locations on an IC chip.

Specifically, referring to the flow diagram of FIG. 7, this method can comprise providing a test integrated circuit (IC) chip in a chip package (702). This test IC chip can comprise a substrate having a frontside and a backside opposite the frontside. The test IC chip can further comprise multiple test devices 810 located at different locations on the frontside.

Figure 8:
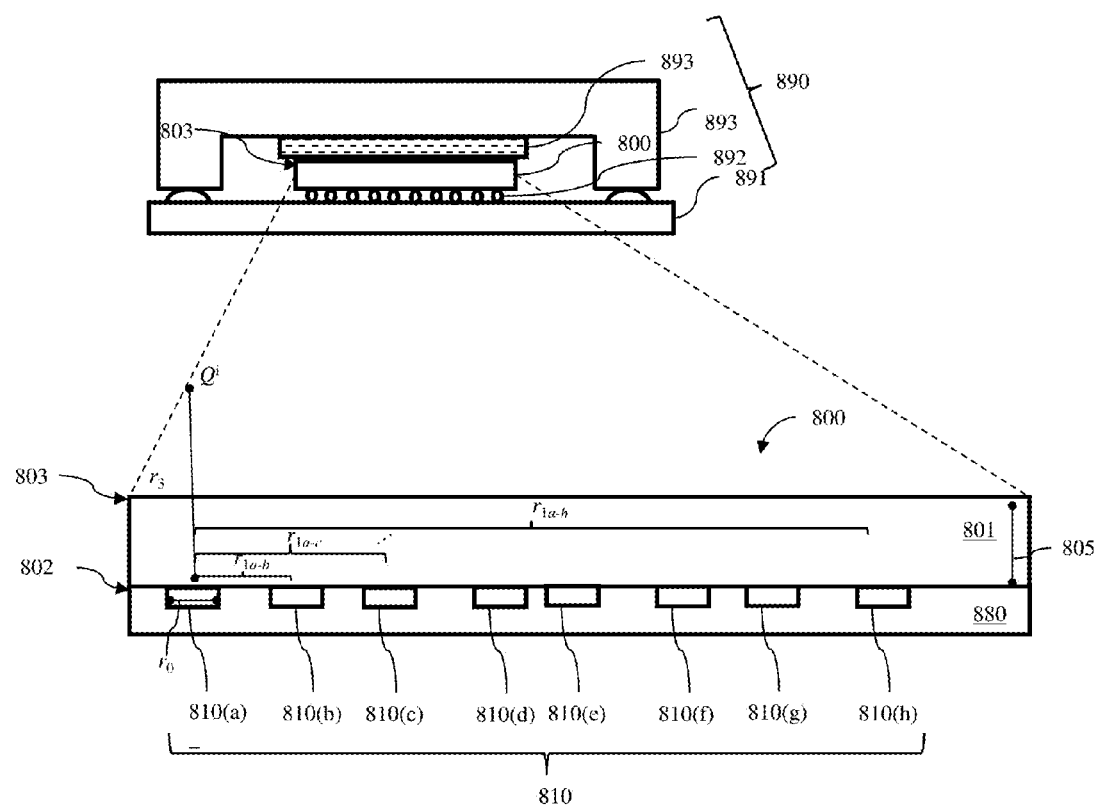
FIG. 8 is a schematic diagram illustrating an exemplary test IC chip that can be used in the method of FIG. 7.

FIG. 8 illustrates an exemplary test IC chip 800 mounted on a chip carrier 891 (e.g., an organic laminate substrate) of a chip package 890. The test IC chip 800 comprises a substrate 801 having a specific thickness 805, a frontside 802 upon which various test devices 810 are formed and a backside 803 opposite the frontside 802. For illustration purposes, eight test devices are shown; however, it should be understood that any number of three or more test devices may be formed on the frontside 802 of the substrate 801. The test devices 810 can comprise active devices (e.g., field effect transistors, bipolar transistors, etc. and/or passive devices (e.g., resistors, capacitors, inductors, etc.). The test devices 810 can further be covered with interlayer dielectric material and back end of the line (BEOL) metal wiring levels 880 that allow for interconnections between the devices and also with the chip carrier 891. For purposes of illustration, the IC chip package 890 is shown as a "flip chip package". That is, the test IC chip 800 is mounted on the chip carrier 891 with the frontside 802 of the substrate 801 facing the chip carrier 891 and solder joints 892 electrically connecting the metal wiring levels 880 to the chip carrier 891. A lid 893 covers the test IC chip 800 and is also attached to the chip carrier 891. Optionally, a thermal compound (e.g., thermal paste, gel or grease) can fill the gap between the lid 893 and the backside 803 of the substrate 801 for purposes of heat removal. Alternatively, the IC chip package 890 can be a standard package (not shown) with the test IC chip 800 mounted on the chip carrier 891 such that the backside of the test IC chip 800 faces the chip carrier 891 and such that wires are used to make the required connection between the BEOL metal wiring levels 880 and the chip carrier 891. In any case, the IC chip package 890 can further be configured for attachment to a printed circuit board (PCB).

The method can further comprise selecting one of the test devices (e.g., test device 810(a)) at a specific location on the frontside 802 of the substrate 801 to be a heat source for which a value (X) of a specific ratio of an imaginary heat amount to an actual heat amount and a corresponding effective thermal radius ($r_0$) to be determined (704). Furthermore, at process 704, and at least two others of the test devices (e.g., test devices 810(b)-(h)) are selected to be temperature sensors, wherein the centers of the temperature sensors 810(b)-(h) are separated from the center of the heat source 810(a) by different distances (e.g., see distances $r_{1a-b}$-$r_{1a-g}$, respectively).

The method can further comprise biasing the heat source 810(a) (i.e., biasing the test device that was selected to be the heat source) using a specific supply voltage (706). Specifically, the supply voltage used to bias the heat source 810(a) can be a specific supply voltage that is sufficiently high to heat the heat source 810(a) above a nominal temperature. It should be noted that a second supply voltage can be used to bias the temperature sensors 810(b)-(h) (i.e., the two or more other test devices that were selected to be temperature sensors). However, this second supply voltage should be less than the supply voltage used to bias the heat source and, more specifically, should be sufficiently low so as to avoid self-heating of the temperature sensors.

The method can further comprise, during this biasing process, determining any changes in temperature of the heat source 810(a) and the temperature sensors 810(b)-(h) relative to the nominal temperature (708). The changes in temperature of the heat source 810(a) and the temperature sensors 810(b)-(h) can be determined, for example, by measuring a performance attribute of each of the test devices 810(a)-(h), wherein the value of the performance attribute is temperature-dependent and, thereby indicative of the temperature.

Figure 9:
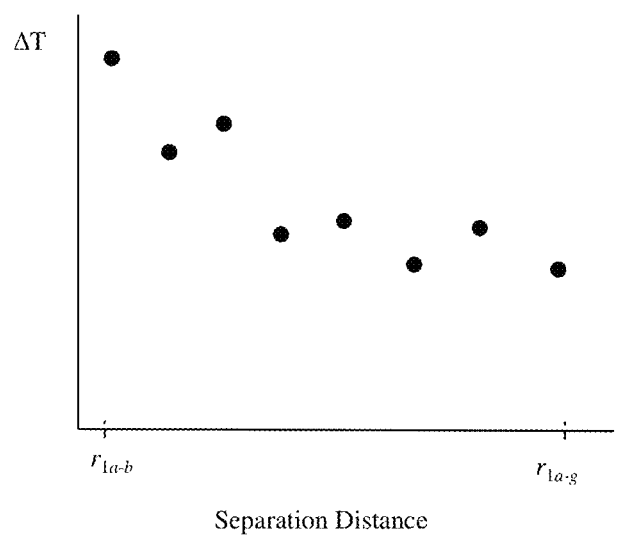
FIG. 9 is an exemplary graph illustrating data acquired and plotted at processes 708-710 of FIG. 7.

The method can further comprise plotting the data acquired at process 708 in a graph (710). Specifically, each change in temperature at each temperatures sensor that is located a different distance, respectively, can be plotted in a graph. As illustrated in FIG. 9, such a graph will that indicate the relationship between any changes in temperature at the temperature sensors 810(b)-(h) to the different distances that separate the heat source 810(a) from those temperature sensors 810(b)-(h), respectively. It should be noted that, as mentioned above, only two or more temperature sensors are required to find a relationship change in temperature-separation distance relationship; however, by using more than two temperature sensors a more accurate representation of this relationship can be found.

The method can further comprise finding a curve for the following equation (17) that fits the data acquired at process 708 and plotted in a graph at process 710 (712, see the curve shown in FIG. 10):

$$\Delta T = Q * \left( \frac{1}{r1} + \frac{X}{\sqrt{r_1^2 + 4*t^2}} \right), \quad (17)$$

where equation (17) is derived from equation (13) above and where ΔT represents the change in temperature at a temperature sensor, Q represents the amount of heat at the heat source, $r_1$ represents the distance between the heat source and the temperature sensor and t represents the thickness of the substrate.

It should be noted that this process 712 can be performed manually, for example, by solving equation (13) for different values of X and Q until such time as a curve that fits the data is found. Alternatively, this process 712 can be performed using a least squares technique using equations (11) and 12).

Figure 10:
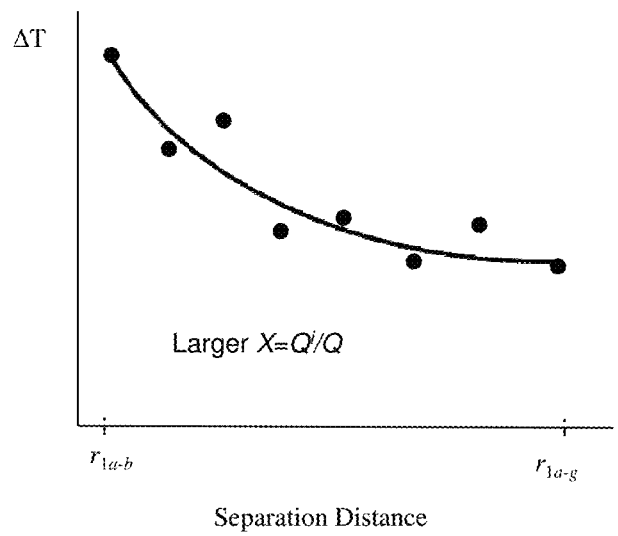
FIG. 10 is an exemplary graph illustrating a curve fit at process 712 to the data shown in the graph of FIG. 9.
Figure 11:
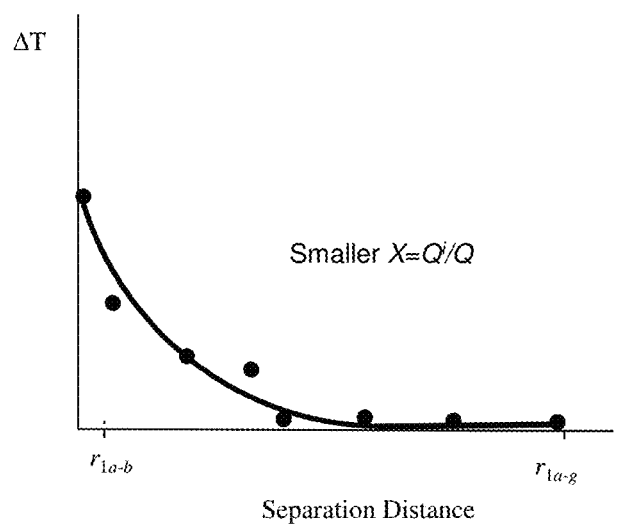
FIG. 11 is another exemplary graph illustrating how the value (X) for an imaginary heat amount ($Q^i$) to actual heat amount (Q) ratio will be larger or smaller depending upon the shape of the curve.

In any case, once the curve for equation (13) is found, the value (X) of the specific ratio of an imaginary heat amount to an actual heat amount to be associated with the specific location of that selected heat source 810(*a*) can be extracted (714). Those skilled in the art will recognize that, given equation (13), the shape of the curve will dictate how large or small the value (X) of the ratio will be. That is, a relatively shallow curve as illustrated in the graph of FIG. 10 will have a larger X value, whereas a relatively steep curve will have a smaller X value.

Once the value (X) of the specific ratio of an imaginary heat amount to an actual heat amount to be associated with the specific location of the heat source 810(*a*) is found, equation (14) above can be used to determined a corresponding effective thermal radius ($r_0$) that is also to be associated with the specific location of the heat source 810(*a*) (716).

Processes 704-716 can be repeated so that each of the test devices 810(*a*)-(*h*) at each of the different locations are eventually selected to be a heat source for which a value of a specific imaginary heat amount to actual heat amount ratio and a corresponding effective thermal radius are determined. It should be understood that for different test devices at different locations, the value X of the specific ratio of an imaginary heat amount to an actual heat amount may or may not vary under the same biasing conditions. Test devices within the same area of the IC chip (e.g., at the center of the IC chip) will typically have the same or a similar X value, but a different X value than test devices in a different area of the IC chip (e.g., at the edge of the IC chip).

It should be understood that the actual heat amount (Q) and, thus, the imaginary heat amount ($Q^i$) associated with a given location of a test device will be different for different supply voltages (i.e., for different biasing conditions); however, the value (X) of the ratio of the specific imaginary heat amount ($Q^i$) to the actual heat amount (Q) should always be the same. That is, for a given test device at a given location, the value of X in the equation $Q^i = XQ$ will always be the same, regardless of the biasing conditions.

Following processes 704-716, a set of values (X) of ratios of an imaginary heat amount to an actual heat amount and corresponding thermal radius that are associated with different locations on the chip, respectively, can be stored in memory (718). This set can subsequently be accessed (e.g., by a processor) and used to generate thermal models of localized temperature changes on a functional IC chip, using the system and/or method embodiments described above (720). It should be noted that the information in the set will only be usable for generating thermal models associated with IC chips having a substrate with the same thickness as that of the test IC chip and packaged in the same type of chip package as that used for the test IC chip.

Also disclosed herein is a computer program product for performing thermal modeling, as described above. The computer program product can comprise a computer readable storage medium having program instructions embodied therewith (e.g., stored thereon). These program instructions can be executable by the computer to cause the computer to perform the above-described method for thermal modeling. More particularly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
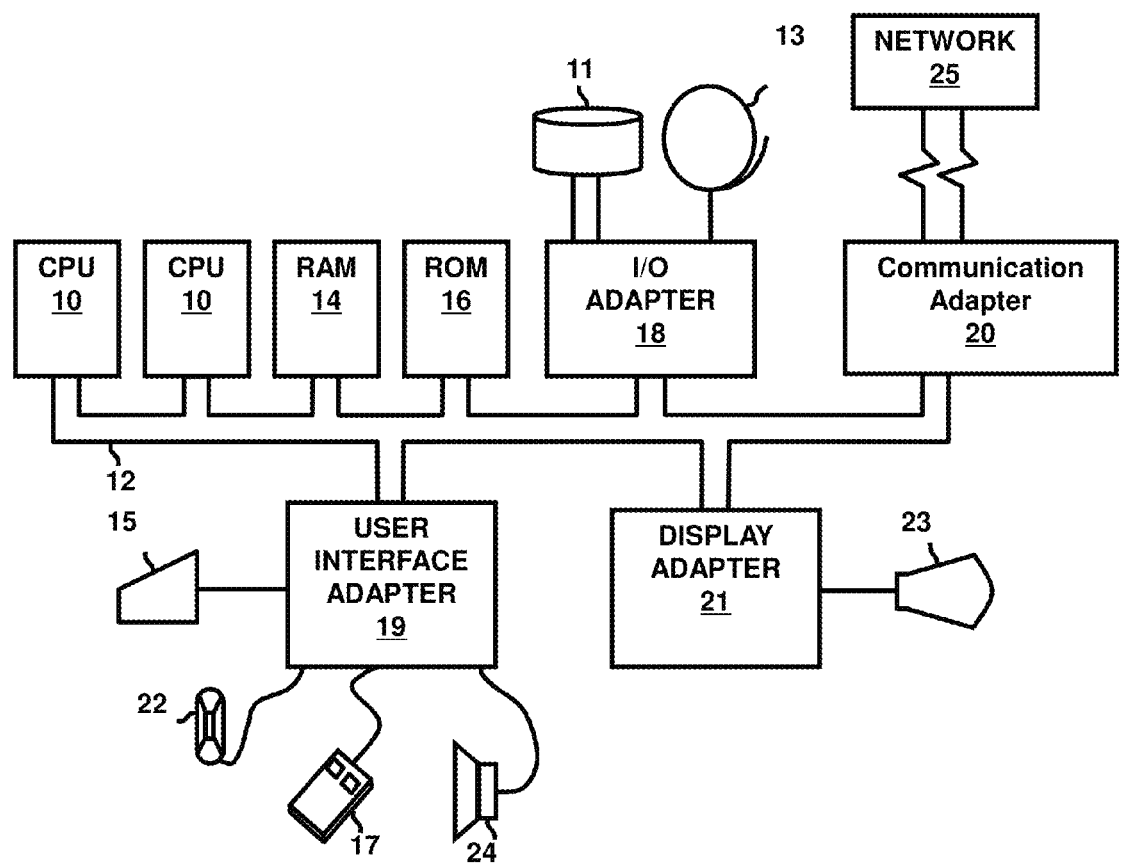
FIG. 12 is schematic diagram illustrating a representative hardware environment for implementing the system and method disclosed herein.

A representative hardware environment (i.e., a computer system) for implementing the system, method and computer program product for thermal modeling described above is depicted in FIG. 12. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed systems, methods and computer program product for thermal modeling and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated devices, integers, steps, operations, elements, and/or components, but do not preclude the presence or addition of one or more other devices, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

Therefore, disclosed above are embodiments of a system and method for thermal modeling and, particularly, for modeling a temperature change of a device at one location on a frontside of an integrated circuit (IC) chip due to self-heating, if any, and further due to thermal coupling with device(s) at other location(s) on the frontside of the IC chip, given the possibility of inefficient heat removal from the backside of the IC chip. The embodiments avoid the need for calculations of thermal resistances by employing thermal potential theory. Specifically, in the embodiments, a boundary condition can be set off the backside of the IC chip. The boundary condition is analogous to an "image charge" used in electrostatics and is referred to herein as an imaginary heat amount. In order to implement the system and method, ratios of an imaginary heat amount to an actual heat amount for different locations on the IC chip must be predetermined using a test integrated circuit (IC) chip, which has multiple test devices at different locations and the same packaging solution as the IC chip at issue. During testing, one test device at one specific location on the test IC chip can be selected to function as a heat source, while the other test devices at other locations on the test IC chip function as temperature sensors. The heat source can be biased and changes in temperature at the heat source and at the sensors can be determined. These changes in temperature can then be used to calculate the value of the imaginary heat amount to actual heat amount ratio to be associated with the specific location. These processes can be repeated for all of the different locations and a set of such imaginary heat amount to actual heat amount ratios can then be stored in memory for use in thermal modeling.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory storing a design layout of an integrated circuit chip in a package and further storing a set of values of imaginary heat amount to actual heat amount ratios,
      wherein the integrated circuit chip comprises: a substrate having a frontside and a backside opposite the frontside; and devices at different locations on the frontside, and
      wherein the values of the imaginary heat amount to actual heat amount ratios in the set are predetermined using a test integrated circuit chip having a same thickness substrate and packaged in a same type package as the integrated circuit chip; and
   a processor in communication with the memory and generating, based on the design layout, a thermal model that models a total change in temperature, relative to a nominal temperature, of a first device on the frontside of the substrate,
      wherein the total change in temperature of the first device is a sum of a first temperature change contribution due to self-heating of the first device and a second temperature change contribution due to thermal coupling with a second device on the frontside,
      wherein the second temperature change contribution is calculated based on a value of a ratio of an imaginary heat amount ($Q^i$) at a point off the backside of the substrate to an actual heat amount (Q) at the second device,
      wherein the value of the ratio is selected from the set based on a specific location of the second device on the frontside of the substrate and is used to account for inefficient heat removal from the backside of the substrate, and
      wherein the point off the backside of the substrate is aligned vertically with the specific location and is separated from the backside of the substrate by a same distance as the specific location.

2. The system of claim 1, wherein the first temperature change contribution is determined using device characterization techniques.

3. The system of claim 1, wherein the second temperature change contribution is equal to a sum of a first ratio of the actual heat amount (Q) at the second device over a first distance ($r_1$) between the first device and the second device and a second ratio of the imaginary heat amount ($Q^i$) over a second distance ($r_2$) between the first device and the point.

4. The system of claim 3,
   wherein the imaginary heat amount ($Q^i$) is different from a mirror heat amount of the actual heat amount (Q) at the second device when a temperature at an area on the backside of the substrate and aligned between the point and the second device differs from the nominal temperature, and
   wherein the imaginary heat amount ($Q^i$) is a mirror heat amount of the actual heat amount (Q) when the temperature at the area is at the nominal temperature.

5. The system of claim 1,
   wherein the processor further generates a compact model that models performance of the integrated circuit chip based on the thermal model,
   wherein the process further adjusts design specifications for the integrated circuit chip based on the compact model in order to generate a final design for the integrated circuit chip, and
   wherein integrated circuit chips are manufactured according to the final design.

6. A system comprising:
   a memory storing a design layout of an integrated circuit chip in a package and further storing a set of values of imaginary heat amount to actual heat amount ratios,
      wherein the integrated circuit chip comprises: a substrate having a frontside and a backside opposite the frontside; and devices at different locations on the frontside, and
      wherein the values of the imaginary heat amount to actual heat amount ratios in the set are predetermined using a test integrated circuit chip having a same thickness substrate and packaged in a same type package as the integrated circuit chip; and
   a processor in communication with the memory and generating, based on the design layout, a thermal model that models a total change in temperature of a first device on the frontside of the substrate,
      wherein the total change in temperature, relative to a nominal temperature, of the first device is a sum of a first temperature change contribution due to self-heating of the first device and multiple second temperature change contributions due to thermal coupling with multiple second devices on the frontside,
      wherein each second temperature change contribution corresponds to a second device and is calculated based on a value of a ratio of an imaginary heat amount ($Q^i$) at a point off the backside of the substrate to an actual heat amount (Q) at the second device, wherein the value of the ratio is selected from the set based on a specific location of the second device on the frontside of the substrate and is used to account for inefficient heat removal from the backside of the substrate, and wherein the point off the backside of the substrate is aligned vertically with the specific location and is separated from the backside of the substrate by a same distance as the specific location.

7. The system of claim 6, wherein the first temperature change contribution is determined using device characterization techniques.

8. The system of claim 6, wherein the second temperature change contribution is equal to a first ratio of the actual heat amount (Q) at the second device over a first distance ($r_1$) between the first device and the second device and a second ratio of the imaginary heat amount ($Q^i$) over a second distance ($r_2$) between the first device and the point.

9. The system of claim 8, wherein the imaginary heat amount ($Q^i$) is different from a mirror heat amount of the actual heat amount (Q) at the second device when a temperature at an area on the backside of the substrate and aligned between the point and the second device differs from the nominal temperature, and wherein the imaginary heat amount ($Q^i$) is a mirror heat amount of the actual heat amount (Q) when the temperature at the area is at the nominal temperature.

10. The system of claim 6, wherein the processor further generates a compact model that models performance of the integrated circuit chip based on the thermal model, wherein the process further adjusts design specifications for the integrated circuit chip based on the compact model in order to generate a final design for the integrated circuit chip, and wherein integrated circuit chips are manufactured according to the final design.

11. A method comprising:

accessing, by a processor from memory, a design layout of an integrated circuit chip in a package and a set of values of imaginary heat amount to actual heat amount ratios, wherein the integrated circuit chip comprises: a substrate having a frontside and a backside opposite the frontside; and devices at different locations on the frontside, and wherein the values of the imaginary heat amount to actual heat amount ratios in the set are predetermined using a test integrated circuit chip having a same thickness substrate and packaged in a same type package as the integrated circuit chip; and generating, by the processor based on the design layout, a thermal model that models a total change in temperature, relative to a nominal temperature, of a first device on the frontside of the substrate, wherein the total change in temperature of the first device is a sum of a first temperature change contribution due to self-heating of the first device and a second temperature change contribution due to thermal coupling with a second device on the frontside, wherein the second temperature change contribution is calculated based on a value of a ratio of an imaginary heat amount ($Q^i$) at a point off the backside of the substrate to an actual heat amount (Q) at the second device, wherein the value of the ratio is selected from the set based on a specific location of the second device on the frontside of the substrate and is used to account for inefficient heat removal from the backside of the substrate, and wherein the point off the backside of the substrate is aligned vertically with the specific location and is separated from the backside of the substrate by a same distance as the specific location.

12. The method of claim 11, wherein the first temperature change contribution due to the self-heating is determined using device characterization techniques.

13. The method of claim 11, wherein the second temperature change contribution is equal to a first ratio of the actual heat amount (Q) at the second device over a first distance ($r_1$) between the first device and the second device and a second ratio of the imaginary heat amount ($Q^i$) over a second distance ($r_2$) between the first device and the point.

14. The method of claim 13, wherein the imaginary heat amount ($Q^i$) is different from a mirror heat amount of the actual heat amount (Q) at the second device when a temperature at an area on the backside of the substrate and aligned between the point and the second device differs from the nominal temperature, and wherein the imaginary heat amount ($Q^i$) is a mirror heat amount of the actual heat amount (Q) when the temperature at the area is at the nominal temperature.

15. The method of claim 11, further comprising:

generating a compact model that models performance of the integrated circuit chip based on the thermal model; and adjusting design specifications for the integrated circuit chip based on the compact model in order to generate a final design for the integrated circuit chip, wherein integrated circuit chips are manufactured according to the final design.

16. A method comprising:

accessing, by a processor from memory, a design layout of an integrated circuit chip in a package and a set of values of imaginary heat amount to actual heat amount ratios, wherein the integrated circuit chip comprises: a substrate having a frontside and a backside opposite the frontside; and devices at different locations on the frontside, and wherein the values of the imaginary heat amount to actual heat amount ratios in the set are predetermined using a test integrated circuit chip having a same thickness substrate and packaged in a same type package as the integrated circuit chip; and generating, by the processor based on the design layout, a thermal model that models a total change in temperature of a first device on the frontside of the substrate, wherein the total change in temperature, relative to a nominal temperature, of the first device is a sum of a first temperature change contribution due to self-heating of the first device and multiple second temperature change contributions due to thermal coupling with multiple second devices on the frontside, wherein each second temperature change contribution corresponds to a second device and is calculated based on a value of a ratio of an imaginary heat amount ($Q^i$) at a point off the backside of the substrate to an actual heat amount (Q) at the second device, wherein the value of the ratio is selected from the set based on a specific location of the second device on the frontside of the substrate and is used to account for inefficient heat removal from the backside of the substrate, and wherein the point is aligned vertically with the specific location and is separated from the backside of the substrate by a same distance as the specific location.

17. The method of claim 16, wherein the first temperature change contribution is determined using device characterization techniques.

18. The method of claim 16, wherein the second temperature change contribution is equal to a first ratio of the actual heat amount (Q) at the second device over a first distance ($r_1$) between the first device and the second device and a second ratio of the imaginary heat amount ($Q^i$) over a second distance ($r_2$) between the first device and the point.

19. The method of claim 18, wherein the imaginary heat amount ($Q^i$) is different from a mirror heat amount of the actual heat amount (Q) at the second device when a temperature at an area on the backside of the substrate and aligned between the point and the second device differs from the nominal temperature, and wherein the imaginary heat amount ($Q^i$) is a mirror heat amount of the actual heat amount (Q) when the temperature at the area is at the nominal temperature.

20. The method of claim 16, further comprising:

generating a compact model that models performance of the integrated circuit chip based on the thermal model; and adjusting design specifications for the integrated circuit chip based on the compact model in order to generate a final design for the integrated circuit chip, wherein integrated circuit chips are manufactured according to the final design.

* * * * *